United States Patent
Hussain et al.

(10) Patent No.: US 10,609,080 B2
(45) Date of Patent: *Mar. 31, 2020

(54) PROVIDING FINE-GRAINED ACCESS REMOTE COMMAND EXECUTION FOR VIRTUAL MACHINE INSTANCES IN A DISTRIBUTED COMPUTING ENVIRONMENT

(71) Applicant: Amazon Technologies, Inc., Seattle, WA (US)

(72) Inventors: Amjad Hussain, Bellevue, WA (US); Manivannan Sundaram, Bothell, WA (US); Sivaprasad Venkata Padisetty, Bellevue, WA (US); Nikolaos Pamboukas, Renton, WA (US); Alan Hadley Goodman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/785,314

(22) Filed: Oct. 16, 2017

(65) Prior Publication Data

US 2018/0103066 A1      Apr. 12, 2018

Related U.S. Application Data

(63) Continuation of application No. 14/975,376, filed on Dec. 18, 2015, now Pat. No. 9,794,292.

(Continued)

(51) Int. Cl.
*H04L 29/06*      (2006.01)
*G06F 21/62*      (2013.01)
*H04L 12/24*      (2006.01)

(52) U.S. Cl.
CPC .............. *H04L 63/20* (2013.01); *G06F 21/62* (2013.01); *H04L 41/22* (2013.01); *H04L 41/28* (2013.01); *H04L 63/105* (2013.01)

(58) Field of Classification Search
CPC ....... H04L 63/20; H04L 63/105; H04L 41/22; H04L 41/28; G06F 21/62
See application file for complete search history.

(56) References Cited

U.S. PATENT DOCUMENTS

| 7,620,984 B2 * | 11/2009 | Kallahalla | G06F 21/6227 711/6 |
| 9,516,028 B1 * | 12/2016 | Andruschuk | H04L 63/10 |

(Continued)

OTHER PUBLICATIONS

"AWS Systems Manager—User Guide", Available for Public Use as of Nov. 6, 2014, Retrieved From https://docs.aws.amazon.com/systems-manager/latest/userguide/systems-manager-ug.pdf (Year: 2014).*

(Continued)

*Primary Examiner* — Chau Le
(74) *Attorney, Agent, or Firm* — Davis Wright Tremaine LLP

(57) ABSTRACT

A selection of a document that includes a command and a parameter is received, and a user is caused to be associated with a policy that grants permission to execute the document. A request is received, from a requestor, to execute the document, the request including a parameter value, and the requestor is determined to be the user associated with the policy. The user is validated to have access to a resource indicated by the parameter value, and the command is caused to be executed against the resource.

20 Claims, 17 Drawing Sheets

Related U.S. Application Data

(60) Provisional application No. 62/246,537, filed on Oct. 26, 2015.

(56) References Cited

U.S. PATENT DOCUMENTS

| | | | | |
|---|---|---|---|---|
| 2011/0184993 | A1* | 7/2011 | Chawla | G06F 9/45533 707/802 |
| 2012/0124064 | A1* | 5/2012 | Syrowitz | G06F 16/90344 707/754 |
| 2012/0151209 | A1* | 6/2012 | Visnyak | H04L 9/3234 713/166 |
| 2012/0233668 | A1* | 9/2012 | Leafe | G06F 9/44526 726/4 |
| 2013/0152077 | A1* | 6/2013 | Leitman | G06F 8/65 718/1 |
| 2014/0059226 | A1* | 2/2014 | Messerli | G06F 9/5072 709/226 |
| 2014/0208096 | A1* | 7/2014 | Brandwine | H04L 9/3263 713/156 |
| 2014/0373092 | A1* | 12/2014 | Hussain | H04L 63/0272 726/3 |
| 2014/0373126 | A1* | 12/2014 | Hussain | H04L 63/08 726/9 |
| 2016/0344671 | A1* | 11/2016 | Hussain | H04L 51/046 |

OTHER PUBLICATIONS

VMware, "Using vmrun to Control Virtual Machines", VMware, Inc., Published Aug. 21, 2011, retrieved from https://www.vmware.com/support/developer/vix-api/vix112_vmrun_command.pdf, 20 pages.

Amazon Web Services, "AWS re: Invent 2015 (CMP203) New Launch! Amazon EC2 Enhancements for the Enterprise," youtube, published Oct. 16, 2015, retrieved on Dec. 22, 2016, from https://www.youtube.com/watch?v=myijxx5Typw, 1 page.

Anonymous, "Siva's Blog: SSM Prerequisites Setup and Cleanup—Part 1 of 5," retrieved Dec. 13, 2016, from http://www.padisetty.com/2015/08/ssm-prerequisites-setup-and-cleanup.html, 3 pages.

International Search Report and Written Opinion dated Jan. 9, 2017, International Patent Application No. PCT/US2016/058860, filed Oct. 26, 2016.

* cited by examiner

```
PS C:\> Get-SSMDocumentDescription -Name "WebServices=RunPowerShellScript"

Created Date  : 6/18/2015 9:51:35 PM
Description   : This document defines the Windows PowerShell command to run or path to a script to be executed.
Name          : WebServices=RunPowerShellScript
Parameters    : {runCommand, workingDirectory, timeoutSeconds}
Sha1          : f2357bc0560c318a54fde80c7fbc7e5c948daa2
Status        : Active
```

```
PS C:\Users\Administrator\ssmagent> Get-SSMDocumentDescription -Name "WebServices=RunPowerShellScript" |
select -ExpandPropertyParameters DefaultValue    Description                     Name                Type
------------    -----------                     ----                ----
                List of commands or script...   commands            StringList
""              Path to the working direct...   workingDirectory    String
"3600"          Commands' execution timeou...   executionTimeout    String
```

FIG. 10

```
PS C:\> Send-SSMCommand -InstanceId i-bacadb68 -DocumentName "WebService-UpdateVMConfig" -Parameter
@{'version'='3.8.354'; 'allowDowngrade'='true'}

CommandId            : 073ecc21-1726-43bf-S011-b49da205b001
Comment              :
DocumentName         : WebServices-UpdateVMConfig
ExpriesAfter         : 2015-09-02T21:05:44.803Z
InstanceIds          : {i-bacadb68}
OutputDSSStoreName   :
OutputDSSKeyPrefix   :
Parameters           : {[version, Example.Funtime.Internal.Util.AlwaysSendList`1[System.String]]}
RequestedDateTime    : 9/2/2015 8:55:44 PM
Status               : Pending
```

FIG. 11

```
PS C:\> Get-SSMCommandInvocation -Details $true -CommandId $configureWindowsUpdateCommand_CommandId :
select -ExpandProperty CommandPlugins Name                     : webservices:psModule
Output                   : 
                           Successfully enabled Windows automatic update to run daily at 10:00:00 PM.

OutputDSSStoreName       : 
OutputDSSKeyPrefix       : 
ResponseCode             : 0
ResponseFinishDateTime   : 8/26/2015  1:19:45 AM
ResponseStartDateTime    : 8/26/2015  1:19:44 AM
Status                   : Success
```

FIG. 12

PROVIDING FINE-GRAINED ACCESS REMOTE COMMAND EXECUTION FOR VIRTUAL MACHINE INSTANCES IN A DISTRIBUTED COMPUTING ENVIRONMENT

CROSS REFERENCE TO RELATED APPLICATION

This application is a continuation of U.S. application Ser. No. 14/975,376, filed on Dec. 18, 2015, entitled "PROVIDING FINE-GRAINED ACCESS REMOTE COMMAND EXECUTION FOR VIRTUAL MACHINE INSTANCES IN A DISTRIBUTED COMPUTING ENVIRONMENT", which claims priority to U.S. Provisional Application No. 62/246,537, filed on Oct. 26, 2015, entitled "PROVIDING FINE-GRAINED ACCESS REMOTE COMMAND EXECUTION FOR VIRTUAL MACHINE INSTANCES IN A DISTRIBUTED COMPUTING ENVIRONMENT," the content of which is incorporated by reference herein in its entirety.

BACKGROUND

Companies and individuals seeking to reduce the expense and overhead associated with maintaining their own computing resources have turned instead to purchasing remote computing services, such as remote program execution over multiple virtual machine instances and remote data storage, offered by computing resource service providers to customers. Such remote computing services are often configurable and scalable to meet various computing needs of the customers of the computing resource service provider. However, such customers may be performing frequent changes and updates to their virtual machine instances, and, especially for businesses running large numbers of virtual machine instances with limited information technology staff, it can be challenging for customers to issue changes and run one-off commands on each server instance. Furthermore, it is difficult to apply fine-grained control over what operations various users of the virtual machine instances are able to execute.

BRIEF DESCRIPTION OF THE DRAWINGS

Various techniques will be described with reference to the drawings, in which:

FIG. 10 illustrates an example of results of a document description command with the expand property parameters option in accordance with an embodiment;

FIG. 11 illustrates an example of viewing command status for enabling Windows automatic update in accordance with an embodiment;

FIG. 12 illustrates an example of using a command document to downgrade virtual machine configuration to an older version in accordance with an embodiment;

DETAILED DESCRIPTION

Figure 1:
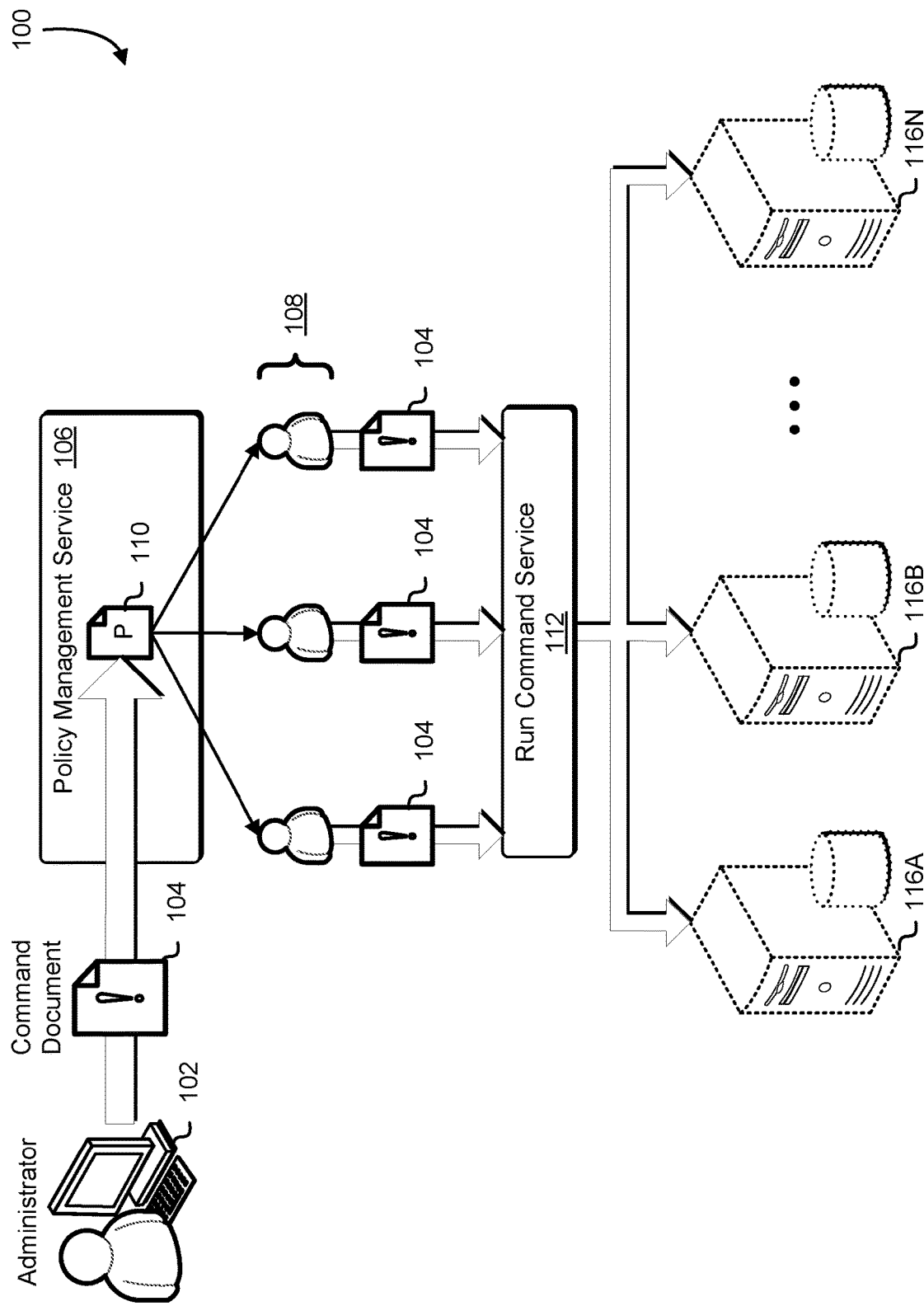
FIG. 1 an example of a run command service in accordance with an embodiment.

In one example, a selection of a command document is received by a system of a computing resource service provider. The command document may be a script or a set of one or more commands for performing one or more operations on or against a specified resource. The command document may include a set of parameters that may be specified, with at least one parameter of the set of parameters indicating the specified resource. The selection of the command document may be a selection made by an administrator of an account with the computing resource service provider, or other authorized entity associated with the account, of a predefined command document, or may be the contents of the command document itself.

The selection of the command document may correspond to a request to grant a specified entity, such as a user associated with the account, permission to execute the command document according to a specified security policy. Consequently, as a result of receiving the selection of the command document, and an identity of the specified user, the system of the present disclosure may associate the specified entity with the specified security policy that grants permission to execute the command document.

In another example, the system may receive an execution request, from a requesting entity, for executing the command document against one or more specified resources. The request may include a set of parameter values corresponding to the set of parameters of the command document. As a result of receiving the execution request, the system may verify whether the requesting entity is associated with a first policy that grants permission to execute the command document. The verification indicates that the requesting entity has insufficient permission to execute the command document, the execution request may be denied.

Also as a result of receiving the execution request, the system may verify whether the requesting entity is associated with a second policy that grants, to the requesting entity, access to perform the one or more operations of the command document against the one or more specified resources. If the verification indicates that the requesting entity has insufficient permission to perform the one or more operations against the one or more specified resources, the execution request may be denied. As a result of successful verification that the requesting entity has permission to execute the command document and that the requesting entity has permission to perform the one or more operations of the command document against the one or more specified resources, the system of the present disclosure may cause the one or more commands of the command document to be performed against the specified resources. In some embodiments, the system may cause the one or more commands to be performed by sending the one or more commands to a software agent that is executing on a computing device hosting a specified resource.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, specifically the field of systems administration, by allowing a system administrator to delegate customized administrative tasks to users tasked with specific responsibilities (delegates) and audit the execution, by the delegates, of the customized administrative tasks. Additionally, techniques described and suggested in the present disclosure improve the efficiency of managing large fleets of computers by allowing administrative tasks to be performed against multiple computing devices asynchronously. Moreover, techniques described and suggested in the present disclosure are necessarily rooted in computer technology in order to overcome a problems associated with a risk of users being inadvertently being granted permissions to perform operations beyond the scope of the users' responsibilities and problems associated with managing particularized permissions on a per-user basis.

FIG. 1 illustrates an aspect of an environment 100 in which an embodiment may be practiced. As illustrated in FIG. 1, the environment 100 may include an administrator 102 who may submit a command document 104 that specifies one or more operations to be performed or a selection of the command document 104 to a policy management service 106. The administrator 102 may associate a policy 110 with one or more users 108 that grants permission to the one or more users 108 to execute the command document 104. The individual users of the one or more users 108 may make execution requests to a run command service 112 of the present disclosure to execute the command document 104. As illustrated in FIG. 1, upon verification that the policy 110 allows fulfillment of the execution request, the run command service 112 may cause the one or more operations specified by the command document 104 to be performed against one or more resources 116A-116N (also referred to as 16N).

The role of administrator may provide full access to all of the resources 116A-16N of the account, and the administrator 102 may be one of one or more users of the account that holds the administrator role. In some examples, an "account" may refer to a customer account of multiple customer accounts managed by the computing resource service provider that provides the one or more resources 116A-16N The policy 110 may be information defining permissions and constraints, such as may defined in an access control language (e.g., eXtensible Access Control Markup Language, etc.) document, on the one or more users 108, applications, and other entities to access the one or more resources 116A-16N. The policy management service 106 may be a system configured to manage policies, such as the policy 110, on behalf of the administrator 102 of the of the account. The policy management service 106 may include an interface that enables the administrator 102 to submit requests related to the management of policies. Such requests may, for instance, be requests to add, delete, or modify a policy for the account, or for other administrative actions, such as viewing an inventory of existing policies.

The one or more users 108 may be one or more of individuals, computing systems, applications, services, resources, or other entities having been authorized to access the account associate with the one or more resources 116-16N. Each user may have a unique name (e.g., username) within the account and may present, or otherwise prove, the possession of security credentials, such as by inputting a password, access key, and/or digital signature, to gain access to computing resources of the account. In some cases, an account may exist with only one user (e.g., the administrator 102); however, additional users may be added or removed from the account as needed.

The run command service 112 may be a service of a computing resource service provider that is integrated with or complementary to a virtual computer system service of the computing resource service provider. The run command service 112 may allow the administrator 102 delegate permission to execute specific commands against the one or more resources 116A-16N to authorized users, such as the one or more users 108. The one or more resources may be virtual machine instances, and the run command service may be a service that provides users with the ability to remotely execute commands specified in the command document 104 against multiple virtual machine instances. In this manner, rather than the users 108 having to remotely connect to each of the one or more resources 116A-16N to perform server administration, or using custom executable code to manage these administration tasks, the run command service 112 may simplify administration by allowing customers to run pre-created scripts or commands against their instances, securely and at scale across their fleet, thereby reducing the amount of time it takes to perform these administration tasks and the potential for human error.

By providing delegated administration, the run command service 112 enables the administrator 102 to set up roles that have defined permissions to perform certain actions. The administrator 102 can give access to specific users of the one or more users 108 and restrict what they can do. For example, the administrator 102 may grant permission to execute a command document that resets user passwords on the one or more resources 116A-16N to help desk personnel of the one or more users 108 without having to grant full administrative control to the help desk personnel. In this manner, the administrator 102 can delegate specific administrative responsibilities to specific users in a consistent and secure way. Furthermore, the run command service 112 may allow for some self-administrative tasks. For example, the command document 104 may be written to, upon execution, reset a password for a user on one or more specified virtual machine instances that the user has access to; by granting permission to the user to execute the command document 104, if the user forgets his/her password, the user can execute the command document 104 to reset his/her password without having to contact the administrator 102 or help desk personnel.

By enabling the one or more users 108 or the administrator 102 to execute a command via the command document 104 against the one or more resources 116A-16N, the one or more users 108 and the administrator 102 can execute commands at scale without having to individually connect to each of the one or more resources 116A-16N.

The administrator 102 and the one or more users 108 may utilize the run command service 112, through a network (e.g., the Internet, local area network, wide area network, etc.), via a user interface or an application programming interface. The administrator 102 and the one or more users 108, through the user interface or as a response to an application programming interface call, may also view the results of executing the command document 104.

The command document 104 (also referred to as a "run command" document or a "simple systems manager (SSM)" document) may be a collection of one or more commands for performing one or more operations. In some examples, the term, "command" may refer to an instruction to perform an operation to/against a resource. Examples of operations that can be specified in the command document 104 include resetting user or administrator passwords on specified instances. In some embodiments, the run command service 112 may track what commands the one or more users 108 have run against the one or more resources 116A-16N. Note, however, in the present disclosure, the term "command," typically in a context of having a command ID, may also refer to an executing command document, rather than a particular command specified within the command document.

In some cases, the command document 104 may be a predefined a set of exemplary commands as determined by the computing resource service provider providing the run command service 112. Examples of predefined command documents could include Web Services-RunPowerShellScript (for executing a Windows PowerShell script), Web Services-InstallApplication (for installing an application to a machine instance), Web Services-ConfigureTelemetry Service (for configuring a telemetry service of the computing resource service provider for the customer account), and Web Services-JoinDirectoryServiceDomain (for joining a directory service domain).

Additionally or alternatively, the command document 104 may be a document provided by the administrator 102 containing a customized set of command. The command document 104 may include some or any command that the one or more users 108 would be able to execute locally on the one or more resources 116A-16N. That is, if the one or more resources 116A-16N are virtual machine instances running a Windows operating system, the run command service 112 may support causing some or any commands that can be run through Windows PowerShell, as well as other predefined commands, to be executed on the virtual machine instances from the command document 104. For example, if a user would normally log into an instance to reset a Web server in a command window, the user, using a command document containing commands to reset the Web server, can now execute that command document against the instance.

In this manner, the run command service 112 may be used to quickly execute remote commands against the one or more resources 116A-16N, thereby enabling the one or more users 108 and/or the administrator 102 to quickly and easily execute remote commands or scripts against the one or more resources 116A-16N. The run command service 112 also eliminates having to manually connect to each of the resources 116A-16N to perform common administrative tasks (e.g., installing software or resetting an administrator password) to the resource.

The run command service 112 execute commands specified in the command document 104. When the command document 104 is executed, run command service 112 causes the commands within the command document to execute against specified resources. Examples of operations that may be specified in the command document may include commands for joining a virtual machine instance to a directory service directory, installing/uninstalling or repairing a software installation, running a Windows PowerShell, and/or configuring telemetry service logs to monitor applications and systems.

The command document 104 may be a "configuration" document expressed in a structured data format, such as JavaScript Object Notation (JSON), Extensible Markup Language (XML), or other similar data exchange format. A computing resource service provider that provides the run command service 112 may provide, to the administrator 102, one or more such predefined command documents for common operations. If the administrator 102, however, has a need to perform very specialized or custom operations, additionally or alternatively run command service 112 may the administrator 102 to author/create a command document to be as open-ended or as very specific as the administrator 102 intends. Once an administrator creates the command document 104, the administrator 102 can cause the run command service 112 to have the command document 104 executed as many times or across as many of the one or more resources 116A-16N as the administrator 102 desires.

As noted, the command document 104 may be a JSON file. The following is an example of JSON schema for a run command document:

```
{
    "$schema": "http://json-schema.org/draft-04/schema#",
    "title": "AWS-SSM-Document",
    "type": "object",
    "required": [ "schemaVersion", "runtimeConfig" ],
    "additionalProperties": false,
    "properties": {
        "schemaVersion": {
            "type": "string"
        },
        "description": {
            "type": "string"
        },
        "parameters": {
            "type": "object",
            "additionalProperties": {
                "type": "object",
                "required": [ "type" ],
                "additionalProperties": false,
                "properties": {
                    "type": {
                        "type": "string",
                        "enum": [ "string",
                            "number", "boolean",
                            "object", "array" ]
                    },
                    "default": {
                        "type": [ "string",
                            "number", "boolean",
                            "object", "array" ]
                    },
                    "description": {
                        "type": "string"
                    }
                }
            }
        },
        "runtimeConfig": {
            "type": "object",
            "additionalProperties": {
                "type": "object",
```

-continued

```
        "required": [ "properties" ],
        "additionalProperties": false,
        "properties": {
            "description": {
                "type": "string"
            },
            "properties": {
                "type": [ "string",
                    "number", "boolean",
                    "object", "array" ]
            }
        }
    }
  }
}
```

Valid parameter types may be string, numeric, object, array, and boolean. A document author may optionally provide default values for parameters. Strings that begin with '{{' and end with '}}' may be considered as command document expressions. A command document expression may be either a function or a parameter. A function may take multiple expressions as arguments. User-Defined parameters may be declared in the "parameter" property of the command document. Parameter names may be an alphanumeric string (e.g., [a-zA-Z0-9]+), and the computing resource service provider may provide an optional predefined list of parameters for use by the document author. A set of functions may will be provided by the run command service 112 to provide more flexible usage of the parameters, such as:

fn:concate(args . . . ) # concatenates the arguments and returns string

An example of a command document, "Example_Document," using JSON can be seen below:

```
{
    "schemaVersion": "1.2",
    "description": "This is Person A's demo command. There
    are no parameters in this document.",
    "parameters": { },
    "runtimeConfig": {
        "webservices:runShellScript": {
            "properties": [
                {
                    "id": "0.webservices: runShellScript",
                    "runCommand": ["ipconfig", "dir"],
                    "workingDirectory": "",
                    "timeoutSeconds": "",
                    "Source": "",
                    "SourceHash": "",
                    "SourceHashType": ""
                }
            ]
        }
    }
}
```

An example of how to call the above command document is shown below:

PS C:\>$runShellCommand=Send-SSMCommand -InstanceId $instanceid -DocumentName Example_Document -Comment 'A demo'

To run a command or script from a command line interface, a user may open a command line interface and execute a supported application programming interface, by passing specifying the command document 104 in required or optional parameters (according to the particular command document) needed to execute the command or launch the script. The command document 104 may include parameters for permitting the user to execute the command against a single resource or multiple resources. Supported application programming interfaces may also include application programming interfaces for checking on the status of the executing command and application programming interfaces for returning the history of execution of such command on a resource.

The administrator 102 can set permissions for which users are allowed to execute the command document 104 by assigning (or creating and assigning) the policy 110 that grants permission to execute the command document 104 to the one or more users 108. For example, for a first command document (having open-ended and highly privileged commands), the administrator can assign, to only a first user, a first policy that grants permission to execute the first document. Whereas, for a second document (having a very constrained commands with limited privileges), the administrator 102 can give all other users access to execute the second document.

Consequently, the administrator 104 has fine-grained control over the operations that can be performed on the one or more resources 116A-16N and which users have permissions to cause the operations to be performed, thereby avoiding an issue where a user could, once connected to a resource, have the ability to perform operations outside the scope of their authority. As noted, in some embodiments the run command service may track/log the operations and/or command documents executed (or attempted to execute) and at the direction of which entity, and in such embodiments the administrator 102 may view this information in audit logs. For example, the administrator 102 create the command document 104 for deleting files and name it "DeleteFiles." The administrator 102 may assign permissions to certain users to execute the "DeleteFiles" command document 104. Thereafter, if a problem arises with file deletion, the administrator 102 can review the audit logs to trace the problem back to the command document 104, the user who executed the command document 104, what operations were performed, and at what time.

The command document 104 may be very specific. For example, the administrator 102 may create a "DeleteFiles" command document that (e.g., "example.exe," etc.). Alternatively, the command document 104 may be more open-ended. For example, the administrator may author the command document 104 to delete whatever file that is passed as a parameter to the command document 104 by the user. The command document 104 may, itself, be viewed by services of the computing resource service provider as a resource, and access control to the command document 104 may be managed by an authentication service of the computing resource service provider. For example, the administrator 102 may grant a first user access to a DeleteSpecificFile command document, and the administrator may grant a second user access to a DeleteAnyFile command document.

Likewise, the administrator 102 may want to give a first subset of users permission to perform a first set of operations and a second subset of users permissions to perform a second set of operations. The administrator 102 would create separate command documents for each of the set of operations. For example, a first command document may be, "RebootMachine," and a second command document may be, "CollectLogs." The administrator 102 may grant the first subset of users access to RebootMachine and the second subset of users access to CollectLogs. Similarly, the administrator 102 may deny the second subset of users access to a third command document that performs registry key updates.

The command document 104 may be created to receive various parameters. For example, a virtual machine instances against which the commands in the command document should be performed may be specified by the calling entity by passing a list of instance identifiers (IDs) as parameters to the command document 104. In some embodiments, virtual machine resource tags may be supported by the run command service 112. In some examples, a "tag" may refer to a label associated with one or more instances for the purpose of designating instances with a common characteristic by which the instances can be filtered or grouped. For example, a first tag may be created with the label "web servers," and instances configured to serve web pages to users may be associated with the first tag. As another example, a second tag may be created with the label "data servers," and instances configured to persistently store and retrieve data may be associated with the second tag. Tags may overlap; for example, an instance may be tagged both as a "web server" and as a "data server."

In this way, a user may specify a tag when executing the command document 104 by passing the tag value as a parameter, and, as a result, the command document 104 may be executed asynchronously against all instances in a fleet of virtual machine instances having the specified tag. For example, to run the command document 104 that has been configured to shut down a virtual machine instance with a reason of, "Planned hotfix install," against all resources of the one or more resources 116A-16N that have been tagged as "Web Server," the user may execute, from a command line interface, a command such as:

»Invoke-SSMCommand -Tag 'WebServer' -DocumentName 'webservices:RunScript' -Parameters @{Script='shutdown /g [p]/d 2:17'}

As noted, when a user executes a command document, the user may specify the target (e.g., machine instance) against which the command document should be executed. The run command service may make an authorization decision to determine whether the user has permission to run the command document against the specified target (e.g., whether the user has access to the command document, whether the user has access to the specified target(s), etc.). That is, in response to a user attempting to execute a document (e.g., "execute the DeleteSpecificFile command document on these specified instances"), the run command service 112 may first verify that the user executing the command document has been granted access to the specified document, and may next verify that the user executing the command document has access to the specified instances. If the answer to either verification is false, the request will be rejected. If the answers to both verifications are true, then the run command service 112 may cause the operations to be performed on the specified instances. Thus, the user could have access to a command document like "DeleteFiles," but would be unable to target a resource that the user does not have access to, or a resource to which the administrator has denied the user delete permissions. More details about the run command service may be found in FIG. 2.

As another example, the administrator 102 grant a first user access to a command document that only allows the first user to examine logs for three specific resources of the one or more resources 116A-16N. For a second user, the administrator 102 grant permissions to a command document that allows the second user to execute privileged operations, such as rebooting certain machines. The administrator 102 may thereafter perform an audit to review the commands that the first user and the second user executed.

An external scheduling tool or service, such as Windows Task Scheduler, may be utilized to schedule when to run the command document 104 with specified parameters. In some embodiments, the administrator 102 or the one or more users 108 can attempt to terminate execution of a command document 104 if the commands of the command document 104 are in a pending or executing state; in such a case, the run command service 112 will attempt to terminate the active command document. In some embodiments, if the command document is run against a resource that is unresponsive or in some state whereby the resource is temporarily unable to execute the commands of the command document 104, the run command service 112 will, for that resource, queue the command document 104 for execution at such time when the resource is able to execute the commands of the command document 104. For example, the run command service 112 may queue the command document 104 and attempt to execute it at hourly intervals for up to 31 days before aborting. In some embodiments, the queue may be throttled; that is, a number of command documents s in the queue may be limited. In some of these embodiments, the number of command documents s may be based on a type of account the one or more resources 116A-16N are assigned to. For example, an account that allows the customer of the computing resource service provider to have up to 100 virtual machines, may limit the queue to hold only 15 command documents. On the other hand, an account for up to 1000 virtual machines, may have a queue that can hold up to 200 command documents.

The run command service 112 may utilize a health check process to identify if a particular machine instance is responsive. For example, the last known heartbeat (e.g., periodic signal sent from the machine instance to indicate normal operation) of the machine instance will be returned, as well as a status indicating whether the machine instance is uninitialized (the machine instance has never been responsive, or there is otherwise no record of heartbeats), active (the machine instance was recently and appears to be actively seeking requests), expired (the machine instance was responsive but no heartbeat has been received for some time, and, consequently, the instance may be unable to receive messages). A couple of ways to enforce the health check may include a reactive status check (i.e., an entity may request the status of the machine instance) and proactive (i.e., status check of the machine instance may be obtained in anticipation of user selection).

In an example situation, the resources 116A-16N comprise a certain number (e.g., 20, 50, 1,000, etc.) of virtual or other machine instances performing various tasks (e.g., some machines are file servers and some are web servers). The run command service 112 allows the administrator 102 to execute the command document 104 to perform administration to apply commands to the virtual or other machine instances performing various tasks. For example, if the administrator 102 needs to collect log reports for 50 of the machine instances, the administrator 102 can execute, through a user interface for the run command service 112, a command document with instructions to collect log reports, passing parameters that identify the 50 machine instances, and the run command service 112 will execute the collect log reports command across the 50 instances in an asynchronous way. In some cases, at a time after the command document has been finished running across the 50 instances, the run command service 112 sends the consolidated results back to the user interface, whereupon the administrator 102 may have the option to an overall view of the execution and/or the option to drill down and look at what each machine instance was doing during execution or what log was collected as a result of executing the command document against the machine instance. Similarly, if the administrator 102 needs to perform some routine administrative task on the 50 machine instances (e.g., to reset the machine instances, to delete a specific file on the machine instances, etc.), the administrator 102 can execute a command document (e.g., via a user interface or at a command line) with instructions for performing the particular administrative task, and have the command document executed against those 50 machine instances.

In this manner, policy and access decisions may be made external to the machine instance, rather than by the machine instance itself; that is, policy decisions may be made by the run command service 112 in conjunction with an authentication service. As a result, policy decisions can be made independent from the operating system running on the machine instance; e.g., the machine instance may be running under Windows, Linux, or some other environment, without affecting operations of the command document, because the policy decisions will be made outside of the machine instance. In other words, the decision of whether to allow or disallow the operation of the command document 104 to execute is already made prior to operation command reaching the machine instance.

Calls to the application programming interfaces may be made over a Hypertext Transfer Protocol Secure (HTTPS) endpoint, and security may be enforced (e.g., unauthorized users prevented from having requests fulfilled) by an authentication service. The agent running on the machine instance may use credentials provided by the computing resource service provider or by the administrator 102, thereby ensuring account level authentication and authorization for the agent.

As noted, the command document 104 created by the administrator 102 may be considered by services of the computing resource service provider as another variation of a standard resource (e.g., similar to data storage resource or virtual machine instance). Once the administrator 102 has authored the command document 104 (i.e., defined what the command document 104 can do), the administrator 102 can specify a policy, via an authentication service, for the command document 104, just as the administrator 102 might do for any other standard resource. For example, the administrator 102 may grant the one or more users 108 access to the resource: <DocumentName> (command document 104).

After the command document 104 has been set up in this manner, a set of options, such as, "Run this Command Now," "Cancel this Command Now," or "Give Me the Result of this Command" an interface for the run command service 112 may be presented to the administrator 102 and/or the one or more users 108. In this manner, when a user selects or calls (e.g., through an application programming interface), "Run this Command Now," the user will indicate the command document 104 that he/she is interested in executing, and specify the instances that he/she is interested in executing the command document 104 against. As a result of run command service 112 receiving the call/request the run command service 112 may obtain the command document 104, verify that the permissions and the policies allow the calling entity to execute the command document 104, determine the target of the command document 104 operations, and verify that the calling entity has access to the specified target. Upon successful verifications, the run command service 112 may cause the command document 104 to be executed on or against the specified target.

In some implementations, the run command service 112 may cause the operations to be performed on or against the specified target by providing the command document 104 to the specified target. The specified target may examine the command document 104 to determine the operation(s) to be performed, perform the operation(s), and then sends a result back to the run command service 112. In other implementations, the run command service 112 may cause the operations to be performed on or against the specified target by providing the individual operations specified in the command document 104 to the specified target. The specified target may perform each individual operation and send the result back to the run command service 112.

The results received by the run command service 112 from the specified target (or targets, if the command document 104 is executed against multiple targets) may be collected/logged. In this manner, the administrator 102 may review the results of the operations performed. The run command service 112, based on the collected results, may show the overall state of the operations against all of the specified target, or the run command service 112 may show the results for a specified target. For example, if one virtual machine out of the 50 virtual machines that were specified failed to fully execute the command document 104, the administrator 102 can, using an interface to the run command service 112, drill down through the collected results to view the state of the machine when the machine was unable to run the request at that time.

In some embodiments, the administrator 102 may even delegate a "create a document" permission to specified users, which would allow the specified users to create their own command documents. Alternatively, the administrator 102 of a particular customer account provided by a computing resource service provider could specify that no other user associated with the customer account is allowed to create command documents. The effect of this case would be that all the other users of the account may only execute existing documents that the administrator 102 has granted them permission to execute. In another scenario, the administrator 102 could grant a particular user, such as a high privileged user, permission to create command documents. In some implementations, the administrator 102 may place restrictions on the types of documents that such other users are able to create. For example, the administrator 102 could grant a user permission to create a command document, but specify that the command document created can only include certain types of operations specified by the administrator 102.

Command documents can include multiple commands, and, upon execution the run command service 112 may handle the queuing, execution and reporting of each command. For example, to cause a command document to run script files that exist in a particular location, a command document may be configured with commands such as:

Invoke-SSMCommand -InstanceID 'i-12345678' -DocumentName 'webservices:RunScript' -Parameters @{Script='c:/tools/AddUsers.PS1'}

Invoke-SSMCommand -InstanceID 'i-12345678' -DocumentName 'webservices:RunScript' -Parameters @{Script='c:/UpdateTask.vbs'}

In some embodiments, the run command service 112 may allow the administrator 102 and/or authorized users to retrieve a history of commands going back a certain period of time (e.g., 90 days) using an application programming interface. In embodiments, execution of a command document need not be completed prior to executing another command document. For example, the run command service 112 may receive multiple orders from the one or more users 108 to execute the command document 104, and the command documents may be executed in the order they are received by the run command service 112. However, in some implementations there may be throttle limits in place to allow no more than a predetermined number of commands to be queued against a particular instance. In some implementations, the throttle limits may vary based on the type of instance (e.g., instances with larger amount of memory and/or processing power may have higher throttle limits than instances with less memory and less processing power) or the type of customer account (e.g., a customer of the computing resource service provider may pay extra for a higher throttle limits).

The execution status (e.g., where each instance stands in the process) of a running command document may be checked by calling a Status( ) application programming interface, and passing the "command ID" associated with the running command document, programmatically (e.g., from an executing software application), through a command line, or through a user interface. In some implementations, the run command service 112 may also be configured to integrate with other services of the computing resource service provider, such as the ability to receive, as parameters, telemetry metrics from a telemetry service of the computing resource service provider.

The environment 100 may be configured with various security measures. For example, the run command service 112 may validate that the user running the command document 104 has access to the command document 104 without sending credentials over the network in plain text. As has been noted, the run command service 112 may provide history that can be tracked, thereby allowing the administrator 1022 audit what commands have been run against any resource. In some implementations, a log of commands they have been executed against the instance may be generated by a software agent executing on the instance, and the software agent may provide the log to the run command service periodically, on-demand, or in response to some other event. In this way, the administrator 102 may be able to view a history of all commands and supporting details of those commands against each instance.

In various embodiments and implementations, one or more resources 116A-16N may be virtual machine instances hosted on physical hosts of the computing resource service provider. In some examples, "virtual machine" may refer to an emulation, in software and/or hardware of a physical computer system, such that software executing in the virtual machine environment behaves as if the virtual machine were a physical computer. However, as it is contemplated that embodiments of the present disclosure may be implemented for non-virtual computing devices as well, "machine instance," as used herein, may refer to virtual and non-virtual computing devices. Although the present disclosure refers to "instances" in many embodiments, it is also contemplated that the resources 116A-16N may include other resources than virtual and non-virtual machines, including networks, databases, and virtual and non-virtual storage devices.

Run command service 112 may provide a set of commands that expose commonly used administrative and management actions. The ability to define the command document 104 and enable the one or more users 108 to perform actions like resetting user passwords and performing various other management tasks, gives the administrator 102 the ability to manage the one or more resources 116A-16N via delegated administration.

A list of example document application programming interfaces for command document creation and management may include CreateDocument( ), GetDocument( ), DeleteDocument( ), DescribeDocument( ), and ListDocument( ) (returns a list of all documents; may return only public documents when if—public is specified).

An example response to calling DescribeDocument( ) may be:

```
Document Description
{
    CreatedDate
    Name
    Sha1
    Status
    Description
    List <Parameters>
}
```

Parameters for DescribeDocument may include:

```
Parameters
{
    Name
    Type
    Description
    DefaultValue
}
```

A list of example document application programming interfaces for managing associations between command documents and resources may include CreateAssociation( ), CreateAssociationBatch( ), DeleteAssociation( ), DescribeAssociation( ), DescribeCommand( ) (gets a command document name and parameters for a given command ID, as well as targeted instances IDs/tags), GetCommandStatus( ) (gets the state and response of an executing command document for each instance to which the command document was sent), ListAssociations( ), and UpdateAssociationStatus( ). A list of example application programming interfaces for managing the interaction between documents and resources (e.g., virtual machine instances) may include SendCommand( ) (executes the specified command document and returns a command ID), ListCommands( ) (list of requested command documents), ListCommandInvocations( ) (list of command invocations), ListRecentCommands( ) (gets a list of recently invoked command documents for an instance or for the account), and CancelCommand( ) (attempts to cancel an executing command document for a specified command ID for an resource or all resources to which the commands of the command document were sent).

The SendCommand( ) application programming interface sends the specified command document to one or more machine instances. This call is asynchronous and returns a command ID that can be used to query status of the command document. Parameters for SendCommand( ) may include:

| | |
|---|---|
| DocumentInstanceIDs | Instance IDs to which to send the command document. |
| Tag | User-specified tag to identify instances to which to send the send command document. |
| DocumentName | Name of the command document. |
| Timeout | Amount of time to wait for a response before terminating. |

| | |
|---|---|
| OutputFolder | Location (e.g., data store folder, network location, database, etc.) where output and debug logs are to be placed. |
| Comment | Description to append to the request (e.g., "Manual fix to an install issue." |

An example response to calling SendCommand( ) may be:

```
Command
{
    CommandId
    DocumentName
    Comment
    Parameters
    Timeout
    List<InstanceId>
    RequestedDateTime
    Status {Pending, Invalid Request, In Progress,
    Completed, Failed, Cancel Requested, Cancelled}
}
```

Parameters for DescribeCommand( ) may include:

| | |
|---|---|
| Command ID | The ID of executing command document to describe. |

An example response to calling DescribeCommand( ) may be:

```
{
    Name: "WebServices:PowerShell",
    Created: "2015-03-49-23-34",
    State: "Invoked",
    instanceIds: "i-12345678, i-12345679",
    Tags: "",
    Parameters @{Script='ipconfig /all'}
}
```

GetCommandStatus( ) parameters may include:

| | |
|---|---|
| Command ID | The ID of the command document. |
| Filters | Key-Value pairs that let the user filter on command document status and instance ID. |
| MaxResults | Max page size of result. |
| NextToken | Token to get next page. |

A response to calling GetCommandStatus may include a response for each instance ID, which may contain an instance ID, state (e.g., "Pending," "Invalid Request," "In Progress," "Completed," "Failed," "Cancel Requested," "Cancelled," etc.), and responses from each plug-in within the command document that was invoked. A response from a plug-in may include a plug-in name (name of plug-in), a response code (response code reported by plug-in), a response time (time of response), a response status (e.g., "Pending," "In Progress," "Completed," "Failed," etc.), response output (content to be determined by plug-in), and output link (link to where extended output logs can be found. A plug-in may be a software component provided to users and administrators of the run command service 112 to perform specialized operations. Examples of plug-ins that may be supported by the run command service 112 include telemetry data collection plug-ins, plug-ins for joining a domain, Windows PowerShell plug-in, various plug-ins for executing script files, messaging handler plug-ins, and so on.

An example response to calling ListCommands( ) may be: List<Command>

Parameters for ListCommands( ) may include CommandId, and InstanceId. An example response to calling ListCommandInvocations( ) may include:

```
List<CommandInvocation>
CommandInvocation
{
    CommandId
    InstanceId
    DocumentName
    Comment
    Timeout
    RequestedDateTime
    Status {Pending, Invalid Request, In Progress,
    Completed, Failed, Cancel Requested, Cancelled}
    List <CommandPlugin>
}
CommandPlugin
{
    Name
    Status {Pending, In Progress, Completed, Failed}
    ResponseCode
    ResponseStartDateTime
    ResponseFinishDateTime
    Output [5K max]
    TraceOutput [5K max]
    OutputFolder
}
```

Parameters for ListCommandInvocations( ) may include CommandId and InstanceId. Details, CommandId, and InstanceIds. Parameters for CancelCommand( ) may include CommandId and InstanceId (IDs for the instances on which the executing command document corresponding to the command ID should be cancelled). Parameters for ListRecentCommands may include:

| | |
|---|---|
| InstanceID | Instance from which to get the history. |
| Filters | Key-Value pairs that lets a user filter on command invocation time and state of an executing command document. |
| MaxResults | Max page size of result. |
| NextToken | Token to get next page. |

A response to calling ListRecentCommands( ) may include a list of recently invoked command IDs in chronological order (most recent invoke first).

A list of example agent management application programming interfaces may include DescribeInstanceInformation( ) (returns instance information (e.g., last heartbeat) for machine instances that have registered with the run command service 112) and UpdateInstanceInformation( ) (used by agent to update machine instance information and ping status). An example response to calling DescribeInstanceInformation( ) may include:

```
List <InstanceInformation>
InstanceInformation
{
    InstanceId,
    PingStatus {Online, LostConnection}
    LastPingDateTime
    AgentVersion
    IsLatestVersion
    NextToken
}
```

Parameters for DescribeInstanceInformation( ) may include:

```
{
    InstanceInformationFilterList,
    Filter keys {InstanceIds, PingStatus, IsLatestVersion,
    AgentVersion},
    MaxResult,
    NextToken
}
```

Example parameters for UpdateInstanceInformation( ) may include:

```
{
    "InstanceInformationList": [
        {
            "Key": "InstanceId",
            "Value": "i-12345678"
        },
        {
            "Key": "AgentVersion",
            "Value": "3.1.2.3"
        },
        {
            "Key": "AgentStatus",
            "Value": "Online"
        }
    ]
}
```

The run command service 112 may provide predefined templates for command documents. The administrator 102, via an application programming interface or user interface, may design his/her own command document based on the predefined templates to include the specific command they would like to see executed in the command document 104.

By allowing an administrator to specify which users can access command resources and what actions users can perform on customer instances through access management permissions and policies, the run command service provides for delegated administration. The run command service collects a detailed history of the commands that users run against their machine instances, including an audit of the command output, thereby providing the ability to audit and report command usage. A run command agent may execute on a remote host that hosts the machine instances, with the agent being responsible for executing commands on remote instances. The run command agent may be a set of instructions executing within the machine instance that interprets the instance configuration and performs operations, such as operations specified in a command document) in response to requests from the run command service.

If a targeted resource for is not running or is unresponsive when a command document is executed, the run command service may queue the command document to run at a time after the resource is responsive again. The run command service may queue the command document and attempt to run it for up to a threshold amount of time (e.g., 31 days) after initially being placed in the queue. Users may execute multiple command documents at the same time, and the run command service will handle the queuing, execution, and reporting of each command document. In some embodiments, throttle limits may limit the number of command documents that can be executed within a given time frame e.g., no more than 60 command documents executed per minute per instance, etc.). A user may attempt to terminate or abort a command document if the command document is in a pending or executing state, and the service will attempt to stop the command document from executing. For example, if the commands of the command document have already been sent to an agent or agents executing on the one or more resources 116A-16N for execution, the run command service 112 may attempt to stop the command document from executing by sending a request to the agent or agents to cancel execution of the commands. Depending on a response from the agent or agents whether the agent or agents were able to terminate (or roll back) execution of the commands, a status of the command document may be updated to "cancelled" or "failed to cancel." As another example, in a case where the status of the command document is "pending" (e.g., the commands have not yet been sent to the agent or agents for execution), the run command service 112 may remove the command document or commands from a list of queued commands (or ignore the command document or commands in response to their release from the queue) and update the status of the command document to "cancelled."

In some embodiments the run command service 112 may utilize a sweeper. The sweeper may be a service or application that runs periodically to clean out old (i.e., exceeding a threshold age limit) command document execution and response history from persistent storage (e.g., deleting and compacting records at the database service 248 of FIG. 2). As noted, the computing system service provider providing the run command service may provide to users predefined command documents. A user may be able to obtain a list of available command documents via a command made at a command line interface, such as:

>Get-SSMDocumentList -Public

In response, the user may receive information, such as the following:

| WebServices Provided Command document Templates |
| --- |
| WebServices:DomainJoin |
| WebServices:PowerShellScript |

More information about individual command documents may be obtained via a command made at a command line interface, such as:

Get-SSMDocumentDescription -Name "WebServices:PowerShellScript"

In response, the user may receive information, such as the following:

| Property | Values |
| --- | --- |
| Name | WebServices:PowerShellScript |
| Description | Run Command Template for executing a PowerShell script |
| Parameters | @[script] |
| Sha1 | 1D13B793702E79F106BEA9E4CD611C865236B60C |

For the user to execute a command document, the user may specify the command document by name and indicate parameter values. For example:

Invoke-SSMCommand -InstanceId "i-12345678" -Name "WebServices:PowerShell" -Parameters @{Script='ipconfig /all'}

Figure 3:
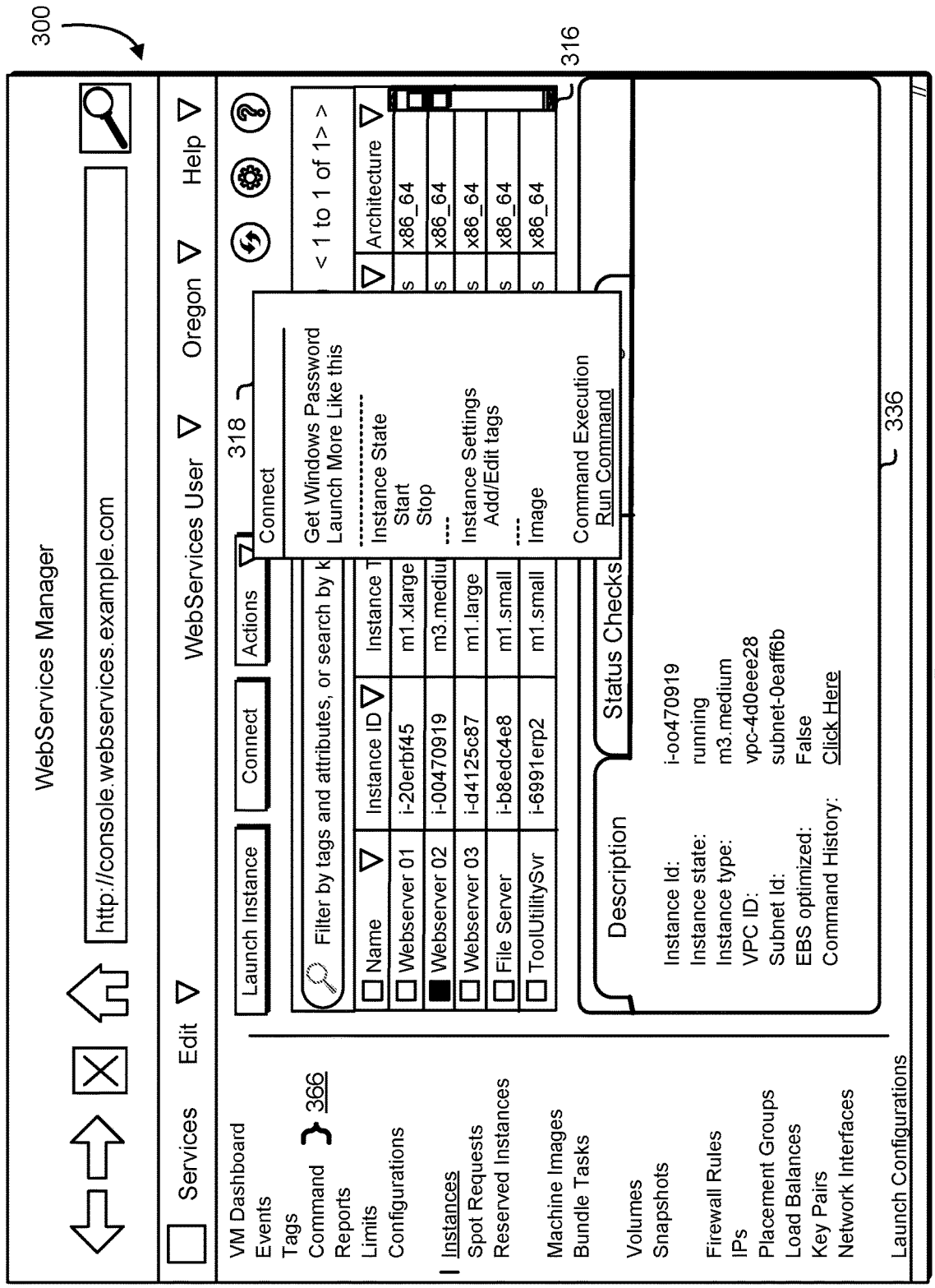
FIG. 3 illustrates an example of a console instance list in accordance with an embodiment.

Creating the command documents, assigning permissions, and executing documents may be performed through a user interface, such as the user interface illustrated in FIG. 3.

Figure 2:
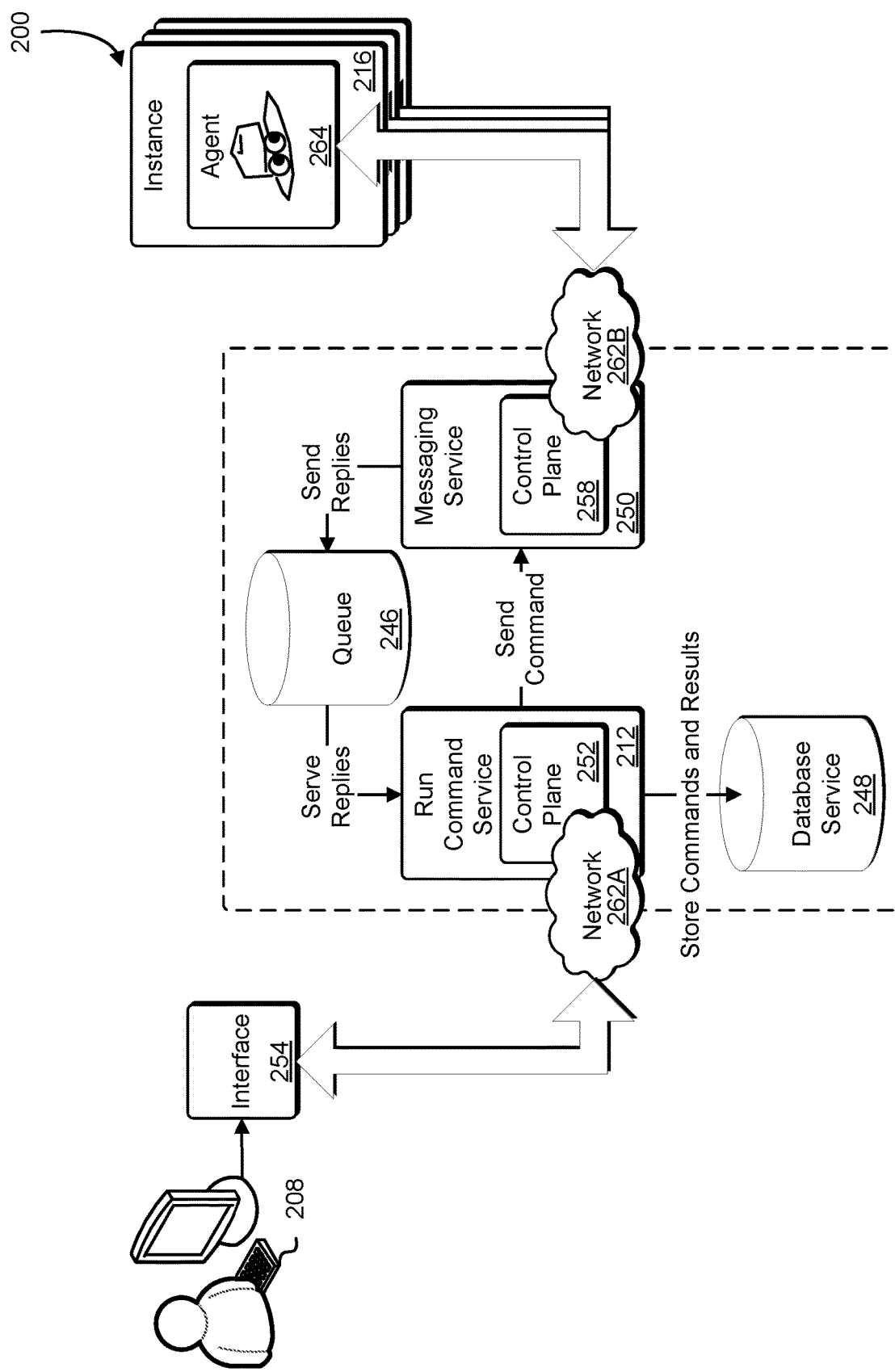
FIG. 2 illustrates an example of run command service architecture in accordance with an embodiment.

FIG. 2 illustrates an aspect of an environment 200 in which an embodiment may be practiced. Specifically, the environment 200 depicts an asynchronous command document execution flow. In the environment 200, the user 208 submit a request via an interface 254 through a network 262A to a control plane 252 of a run command service 212. The user 208 may be an entity, such as the administrator 102 or the one or more users 108 of FIG. 1, and the run command service 212 may be similar to the run command service 112 of FIG. 1. The control plane 252 of the run command service 212 be a component of the run command service that exposes application programming interfaces to the interface 254. The interface 254 may be an interface that allows entities, such as users, administrators, and software applications, to communicate with the run command service 212. Examples of the interface 254 include a command line interface, or a console, web-based or otherwise.

The networks 262A-262B may represent a paths of communication between at least two entities (e.g., between the user 208 and the run command service 212, between the agent 264 and the messaging service 250, etc.). Examples of the networks include the Internet, a local area network, a wide area network and Wi-Fi. The submitted command may be logged in the database service 248 in association with a set of specified instances 216. The database service 248 may be a service of the computing resource service provider that provides an organized collection of data, such as tables, queries, reports, views, and other objects, to customers of the computing resource service provider or other resources or services of the computing resource service provider. The commands within the command document provided by the user 208 may be stored as a set of messages within the queue 246.

The queue 246 may be a collection of computing resources configured to operate as a message store allowing various computing resources of the computing resource service provider to store one or more messages to be read by other computing resources of the computing resource service provider. The queue 246 may be provided by a queue service, such as RabbitMQ, Java Message Service, and Microsoft Message Queuing. Such a queue service may be a queue service that utilizes Advanced Message Queuing Protocol (AMQP). In other implementations, the queues 246 may be one or more records in a database table, one or more arrays, one or more circular buffers, one or more linked lists, one or more stacks, or one or more similar data structures. Each message provided to the queue 246 may comprise any variation of text, such as programming code, uniform resource identifiers for data objects, and other statements. In some embodiments, the queue 246 is implemented as an "unprocessed work" queue, where messages representing unprocessed command documents may be held for a duration of time (e.g., 31 days).

A first message may then be received at the run command service 212 from a queue 246. The run command service 212 may verify, by referencing a data entry with the database service 248, that the status of the command indicates that the command document has not yet been sent to the set of specified instance 216 for execution (e.g., not "Sent"). The run command service 212 may update the status in the database service to indicate that execution of the command is commencing (e.g., "Work in Progress"). The run command service 212 may obtain a set of instance IDs (e.g., instance IDs specified by the user 208, IDs for instances that correspond to a tag specified by the user 208, which may be obtained via a request to a virtual computing system service of the computing resource service provider for the instance IDs of instances associated with the specified tag, etc.). As execution completes for individual instances in the set of specified instances, those processed instance IDs may be removed from the set of instance IDs, thereby leaving only IDs for instances that are still being processed.

The messaging service 250 may be a computing system (e.g., computer device or collection of distributed computing devices) that, in response to a request from another entity (e.g., the run command service 212, the set of specified instances 216, etc.), publishes messages to one or more other entities (e.g., the queue 246, etc.). The messaging service may transmit messages using one or more technologies usable for the transmission of information from the message service to another entity. The messaging service control plane 258 may be used be used to send commands and/or command documents to the set of specified instances 216. The control plane 252 may be a component of the messaging service 250 that sends commands to agents 264 running on the set of specified instances 216 and receives responses/results of execution of the commands against the set of specified instances 216 from the agents 264. The set of specified instance 216 may be a set of one or more virtual machine instances or type of resource described in relation to the one or more resources 116A-16N of FIG. 1.

For each instance of the set of specified instances 216, authorization for executing the command document against the instance by the user 208 may be verified. Upon verification, the run command service 212 may send the command received from the queue 246 to the messaging service 250 to be sent to an agent for execution against the instance. The agents 264 may be software applications that run locally within an instance or local to the physical host hosting the instance. The agents 264 may act as intermediaries (e.g., proxies) between an external entity and the instance (e.g., between the messaging service 250 and the instance). Upon completion or termination of executing the command at their respective instance, the agents 264 may send results (e.g., "Completed," "Error," "Cancelled," etc.) of command execution back to the messaging service 250. The messaging service 250 may push the results as messages to the queue 246. The run command service 212 may receive the results from the queue 246 and cause the status of the commands to be updated at the database service 248.

In conjunction with sending the message to the messaging service 250, the run command service 212 may update the status of the command document for this particular instance with the database service 248 to "Sent," and cause the first message to be removed from the queue 246. As messages are removed from the queue 246, the run command service 212 may cause the status of the command to be updated at the database service 248 (e.g., "Completed"). The user 208 may utilize the interface 254 to retrieve the statuses of the commands from the database service 248 via the run command service 212 for viewing.

FIG. 3 illustrates an example of a user interface 300 of an embodiment of the present disclosure. The user interface 300 may include a list of resources, such as a list of instances in an instances pane 316, against which to run the command document. The list of instances in the instances pane 316 may be based on the results of the user interface calling a run command service with a DescribeInstanceInformation( ) application programming interface call, which may include a set of instance identifier(s) associated with a customer account with the computing resource service provider. In response, the user interface may receive information indicating which of the instance(s) are able to run commands.

To execute a command document, a user, such as the one or more users 108 or the administrator 102 of FIG. 1, may begin by selecting a set of one or more machine instances from the list of instances. As can be seen in the user interface 300, "Webserver 02" has been selected in this manner. After selection of the one or more machine instances, the user may "Run Command" from a context menu 318. As a result of selecting "Run Command," the user interface may respond by opening a window, such as the pop-up dialog 420 of FIG. 4 and the window 620 of FIG. 6, that allows the user to enter a command document or script to run. In response to the user clicking a submit button after entering the command document or script to run, the command document or script may be executed against the selected set of instances. The output from execution of the command document may be available in a status pane, such as the output pane 822 of FIG. 8.

The description pane 336 may display a current status of the selected instance. Clicking on "Command History" may present the user with a screen detailing the command documents that have been run against the instance, including the time they were run, the result of execution, and so on. Clicking on a command link 366 may present the user with a screen (not shown) listing all command documents executed or executing under the account, including such data as command ID, status (e.g., "Completed," "Pending," "Failed," etc.), machine instance ID, and/or comments. If the user does not wish to view all command documents executed or executing, the screen may provide for the ability to filter the list by various criteria, such as for showing only complete tasks, command documents executed within a specific timeframe, and so on. In some implementations, the command history may keep commands in the list for a limited amount of time (e.g., 90 days).

Figure 4:
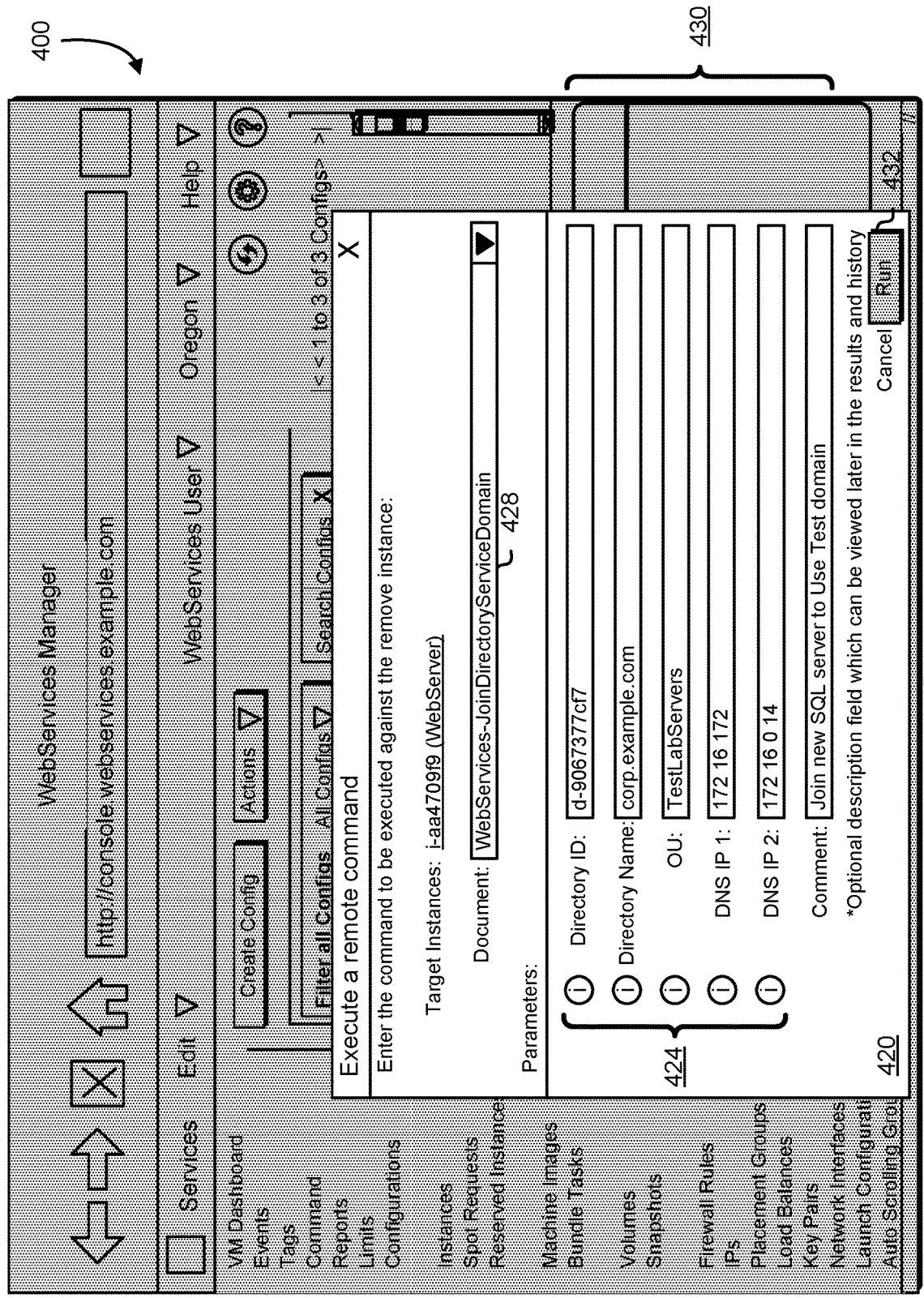
FIG. 4 illustrates an example of filling out domain join fields in accordance with an embodiment.

FIG. 4 illustrates another example of a user interface 400 of an embodiment of the present disclosure. The user interface 400 may include a pop-up dialog 420 that is presented to allows the user to select the command document to start the command workflow. Helper text and descriptive fields/labels 424 (e.g., tooltips) may be made available where possible to help guide users and give the context for each field, and required and optional fields may be visually designated. The "Target Instances" may reflect the set of instances selected from the instances pane 316 of FIG. 3. The command dropdown 428 may contain predefined published command documents and/or plus user-generated documentation. A "learn more" link may be added for additional help and/or a refresher on what fields do what.

Examples of command documents that may be selected from the pop-up dialog 420 may include command documents for joining a directory service domain (shown), command documents for installing an application (not shown), install a Windows PowerShell module (not shown), and so on.

Based on the command document selected and the particular parameters associated with the command document, the pop-up dialog 420 may update itself to include form fields 430 associated with the parameters. For example, the user interface 400 depicts a set of form fields as would be appropriate for the command document for joining a directory service domain. If the selected command document were, instead, a document for installing an application, the user may be presented with a different set of form fields, such as application path, flag the, and so on. The form fields 430 may be pre-populated with default values. When the user is satisfied with the selection of the command document and the parameter values, the user may click the run button 432 to execute the selected command document according to the specified parameters.

Note that the form elements in the preceding and following figures are for illustrative purposes only and the particular form elements used may vary depending on implementation. For example, the command dropdown 428 may be a text box or multi-select box, the buttons shown may instead be graphical icons, and so on. The form elements used in the user interface may be any known form elements suitable for the purpose to which they are implemented, including checkboxes, image maps radio buttons, and so on. Clicking on the command dropdown 428 may yield a list of names of available command documents, and an associated description of each command document. The command document name and description may be set as part of the creation of the command document.

Figure 5:
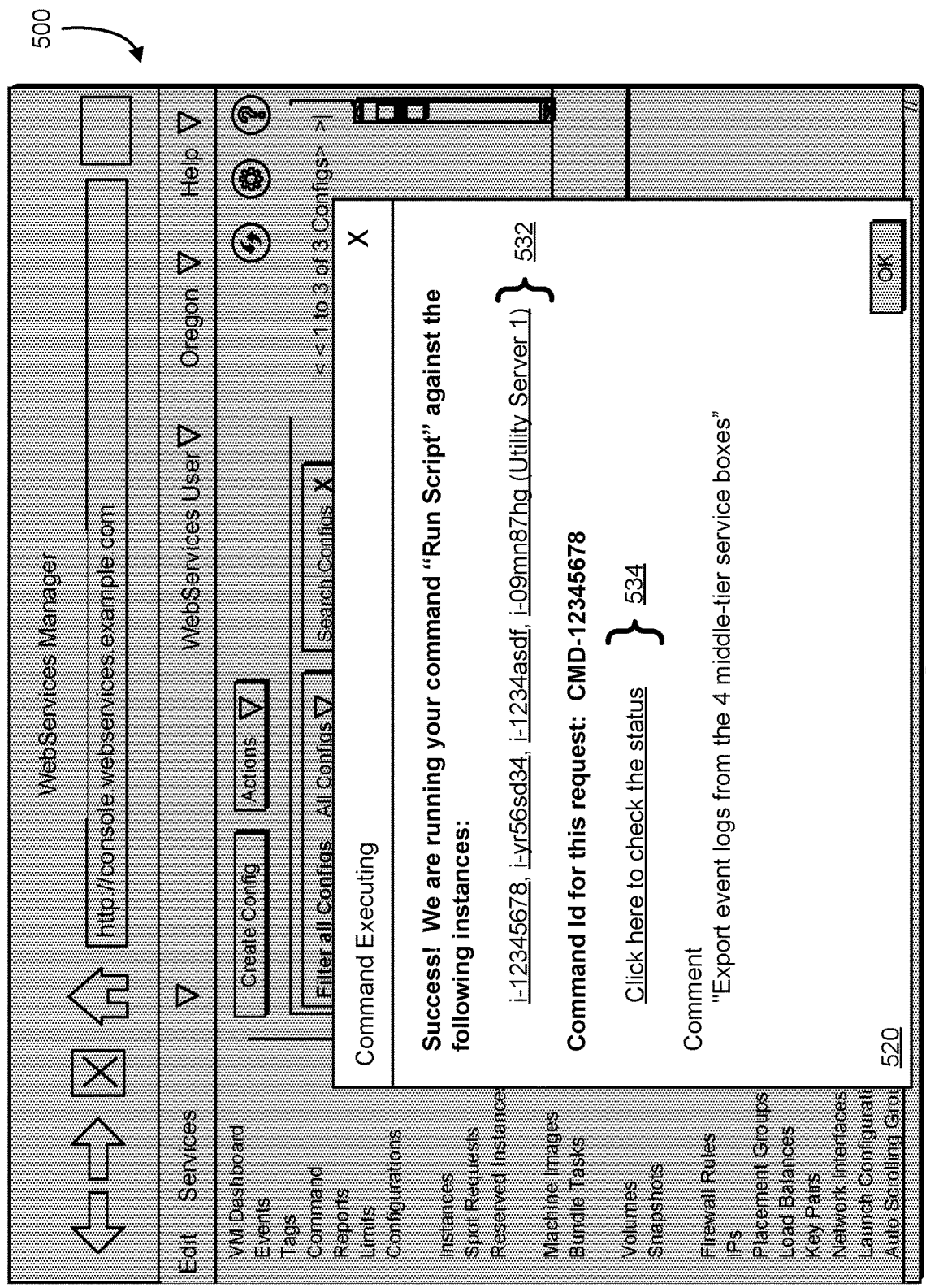
FIG. 5 illustrates an example of executing a remote command in accordance with an embodiment.

FIG. 5 illustrates another example of a user interface 500 of an embodiment of the present disclosure. The user interface 500 may include a window 520 that presents users with a message indicating that the command document is executing (e.g., a success message indicating that execution of the command document was successful) and one or more instance status links 532 to view the status of an command document executing against an instance and/or a command status link 534 for viewing the overall status of the executing command document. Clicking on an instance status link may present the user with a command history tab for that instance. Conversely, if execution of the command document or one or more commands in the command document failed, the window 520 may include appropriate failure/error messages of the command execution flow, as can be seen in FIG. 6.

Figure 6:
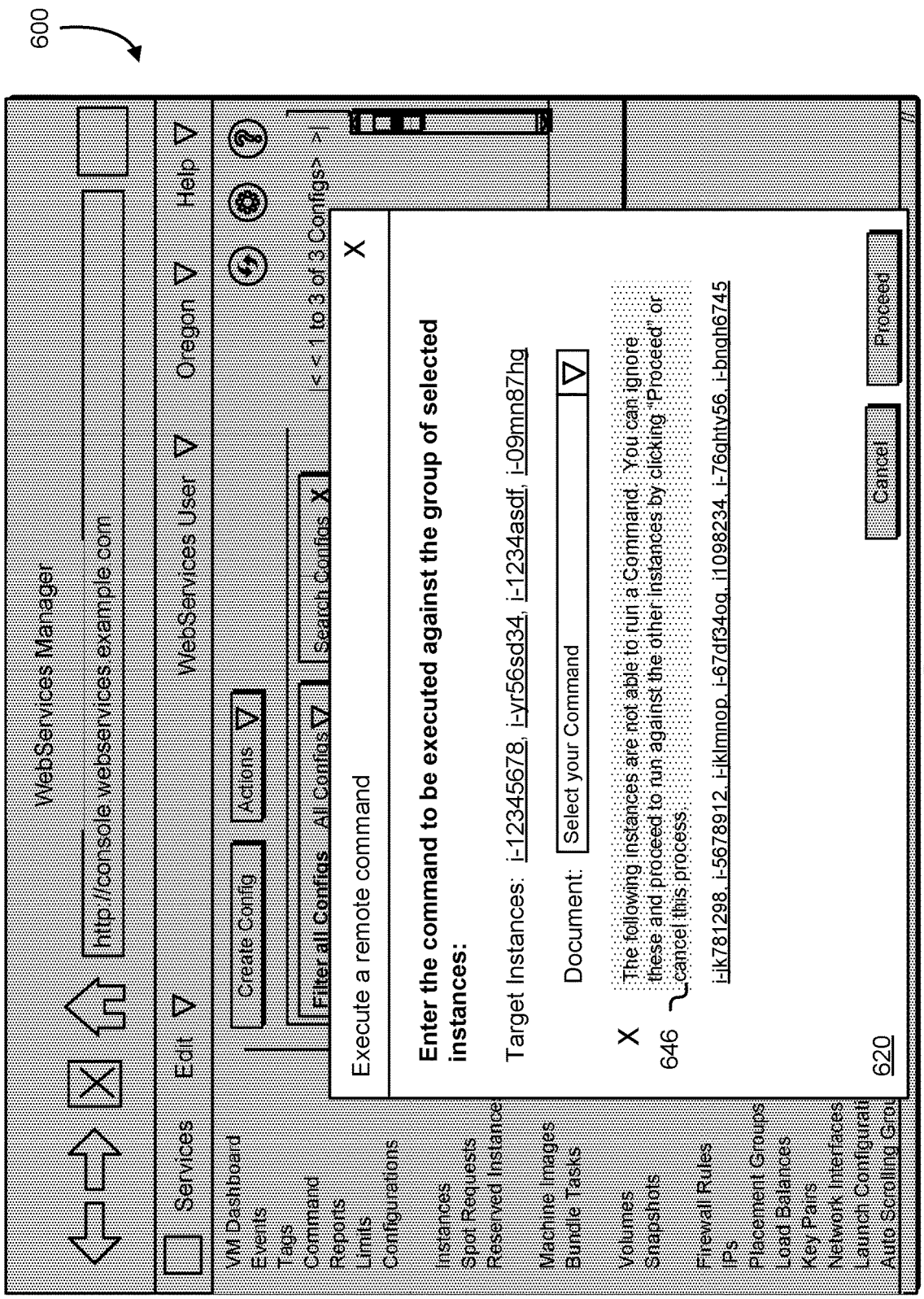
FIG. 6 illustrates an example of a display indicating that a portion of instances are not in a state to accept a command in accordance with an embodiment.

FIG. 6 illustrates another example of a user interface 600 of an embodiment of the present disclosure. If execution of the command document or one or more commands in the command document failed, or if a portion of the selected instances are not in a state to accept a command (e.g., did not respond to an Internet Control Message Protocol echo (i.e., ping) request, an error message 646 may be displayed (e.g., "The following instances are not able to run a command. You can skip these instances and continue to run against the other instances by clicking "Proceed" or you may cancel the process by clicking "Cancel"; in this manner, the user has the ability to decide to abort all execution of the command document or continue executing with the non-failing instances").

Figure 7:
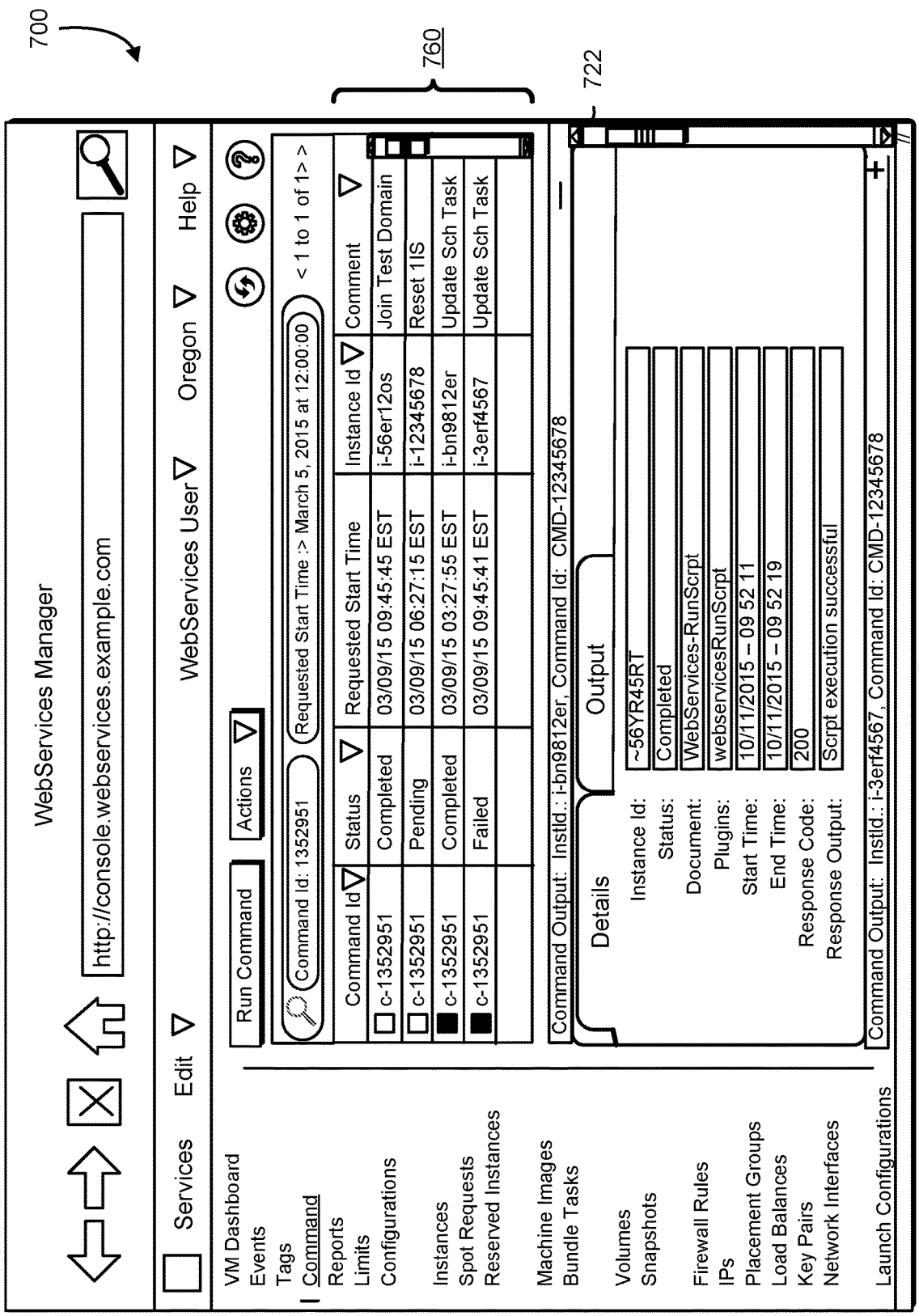
FIG. 7 illustrates an example of changing filters in accordance with an embodiment.

Selecting the command status link 534 may present the user with a screen, such as that depicted in FIG. 7 for viewing the status of an executing or executed command document. FIG. 7 illustrates another example of the user interface 700 of an embodiment of the present disclosure. The user interface 700 may include a command output pane 722 having one or more tabs, such as the details tab and the output tab depicted in the user interface 700. The details tab may contain details about the command history of the specific instance selected, such as instance ID, status, command document name, names of any plug-ins, start time for the execution of the command document, end time of the execution of the command document, and the response code, and/or response output.

As can be seen from the user interface 700, there may be a status for each command invocation on a particular instance (e.g., if one command document was invoked on 10 instances, there would be 10 statuses in total). Command statuses (also referred to as execution statuses), as well as details about various attempts to execute commands against the particular instance, may be viewed in a command status pane 760 of the user interface 700 or may be fetched by using the GetCommandStatus( ) application programming interface which takes, as input, a command ID, and, in response, returns pages of command statuses. In this manner, an administrator or other user viewing the user interface can not only find out the result of each execution attempt, but what commands/operations were actually attempted, as well as information such as start and/or stop time of the execution. For example, if "User A" attempts to run a command to format a partition or delete a file from a drive of a targeted instance, in response to a request from an administrator to view the execution log for the instance, the log view will show whether the command succeeded, the identity of the entity submitting the execution request (e.g., "User A"), and what command document was selected for execution (e.g., "Denied attempt by User A to delete file 'ABC.'"). Each command status may represent an invocation of the command document to a particular instance. The command status pane 760 may contain information, such as instance ID, state ("Pending," "Invalid Request," "Queued," "Executing," "Completed," "Failed," "Cancel Requested," "Cancelled," etc.), responses (response from each plug-in within the command document that was invoked. An agent on the respective machine instance may responsible for providing both the status of the invocation as well the plug-in responses.

Figure 8:
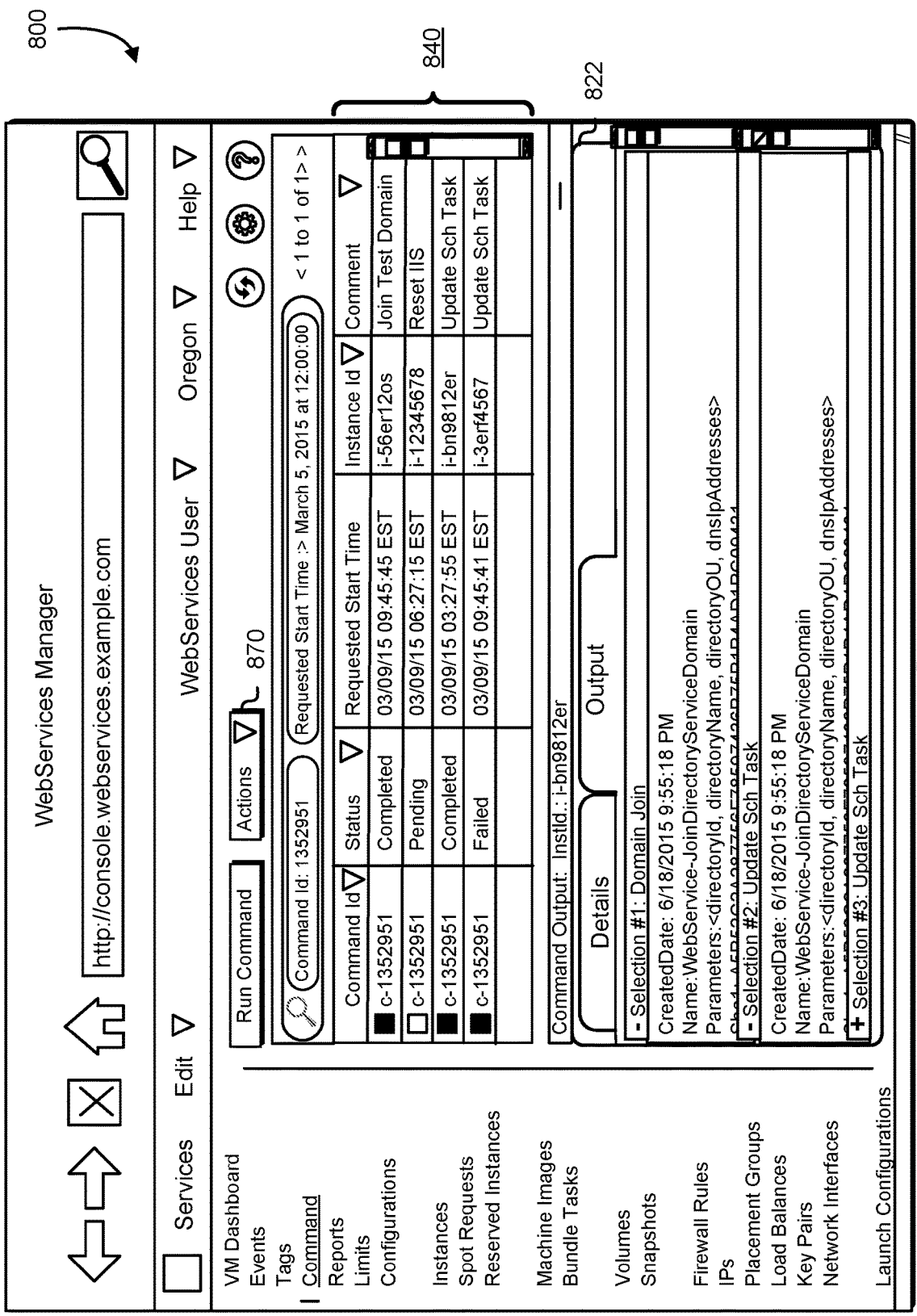
FIG. 8 illustrates an example of plug-in output in accordance with an embodiment.

Selecting the output tab may switch the command output pane 722 to an output pane 822 for viewing the output of the executing or executed command document, as shown in FIG. 8. FIG. 8 illustrates another example of a user interface 800 of an embodiment of the present disclosure. The output pane 822 of the user interface 800 may include expandable/collapsible sub-panes corresponding to specific tasks selected from tasks 840 above, and each command output may be shown within expandable/collapsible sub-pane. An actions button 870 may be used to cause particular actions to be performed against the selected tasks. For example, if some of the tasks are in a "Failed" state, the user may select those tasks from the tasks 840 and select a "Re-Run Command" option from the actions dropdown. Another possible action in the actions dropdown may include "Cancel Pending" for canceling tasks in a "Pending" state. Selecting the "Re-Run Command" option from the actions dropdown may once again invoke the run command feature, which may return the user to an interface similar to the user interface 400 of FIG. 4 and allow the user to change parameter values before running the command document.

Some examples of policies that administrators may use to grant users access to execute command documents are shown below:

| Effect | Policy |
| --- | --- |
| Execute All command documents on All instances in All Regions | "Action": [ "ssm:CreateCommandRequest" ], "Effect": "Allow", "Resource": [ "urn:webservices:ssm:*::document/*", "urn:webservices:vm:*:*:instance/*" ] |
| Execute Windows PowerShell on All instances tagged with stage=prod, everywhere except in region us-west-1 | "Action": [ "ssm:CreateCommandRequest" ], "Effect": "Allow", "Resource": [ "urn:webservices:ssm:*::document/WebServices-RunScript", "urn:webservices:vm:*:*:instance/*" ], "Condition": { |

-continued

| Effect | Policy |
| --- | --- |
| | "StringEquals": { "vm:ResourceTag/stage": "prod" }, "StringNotEquals": { "vm:Region": "us-west-1" } } |

With the run command service, a user may execute any command document or script on a remote machine instance that the user could execute from the instance locally. The user can issue commands or type in a path to a local script to execute the command.

Figure 9:
FIG. 9 illustrates an example of results of a document description command in accordance with an embodiment.

Calling Get-SSMDocumentDescription may return a description of a specified command document and its available parameters. FIG. 9 illustrates a description that is returned from issuing the following command from a command line interface 900:

Get-SSMDocumentDescription -Name "WebServices-RunPowerShellScript"

The user may view details about each parameter, including the default value and parameter type by using an -ExpandProperty Parameters option. FIG. 10 illustrates a description that is returned from issuing the following command with an -ExpandProperty Parameters option from a command line interface 1000:

Get-SSMDocumentDescription -Name "WebServices-RunPowerShellScript"|select -ExpandProperty Parameters The user may obtain command information with response data for an instance.

FIG. 12 illustrates the details returned after executing the following command to downgrade a virtual machine configuration to an older version through a command line interface 1200:

Send-SSMCommand -InstanceId i-bacadb68 -DocumentName "WebServices-UpdateVMConfig" -Parameter @{'version'='3.8.354'; 'allowDowngrade'='true'}

Figure 13:
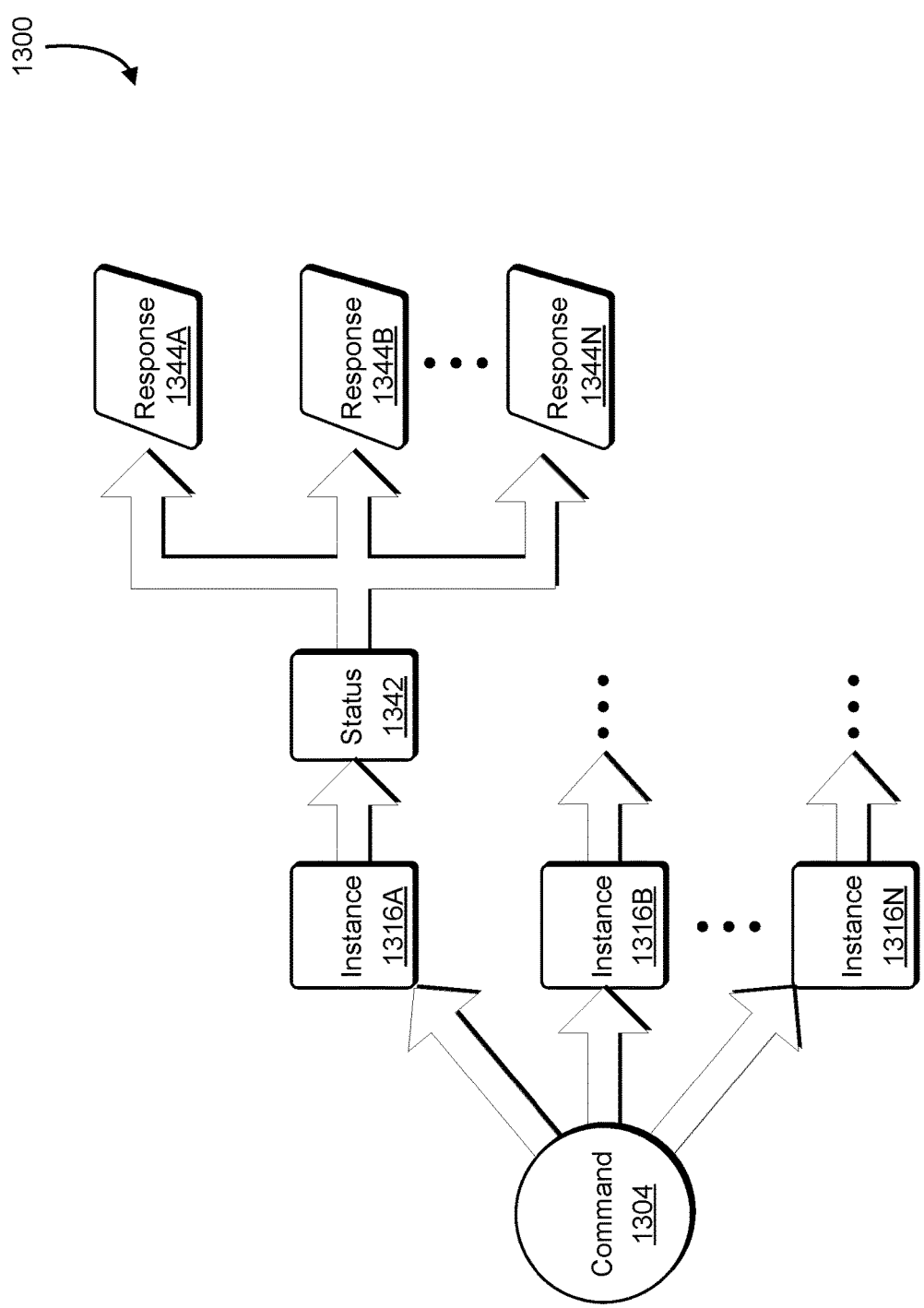
FIG. 13 illustrates an example of command responses in accordance with an embodiment.

FIG. 11 illustrates a command status for a command enabling Windows Automatic Update from a command line interface 1100:

Get-SSMCommandInvocation -Details $true -CommandId $configureWindowsUpdateCommand.CommandId|select -ExpandProperty CommandPlugins FIG. 13 illustrates an execution flow 1300 of a command document of an embodiment of the present disclosure. As illustrated in FIG. 13, a command 1304 of the command document is executed against one or more instances 1316A-1316N. As a result of the execution for each of the one or more instances 1316A-1316N, a software agent may output a status 1342 of the execution. Examples of statuses can be seen in FIGS. 7, 8, 11, and 12. If any plug-ins are run, each of the running plug-ins may provide additional responses 1344A-1344N. FIG. 11 illustrates a plug-in response.

Figure 14:
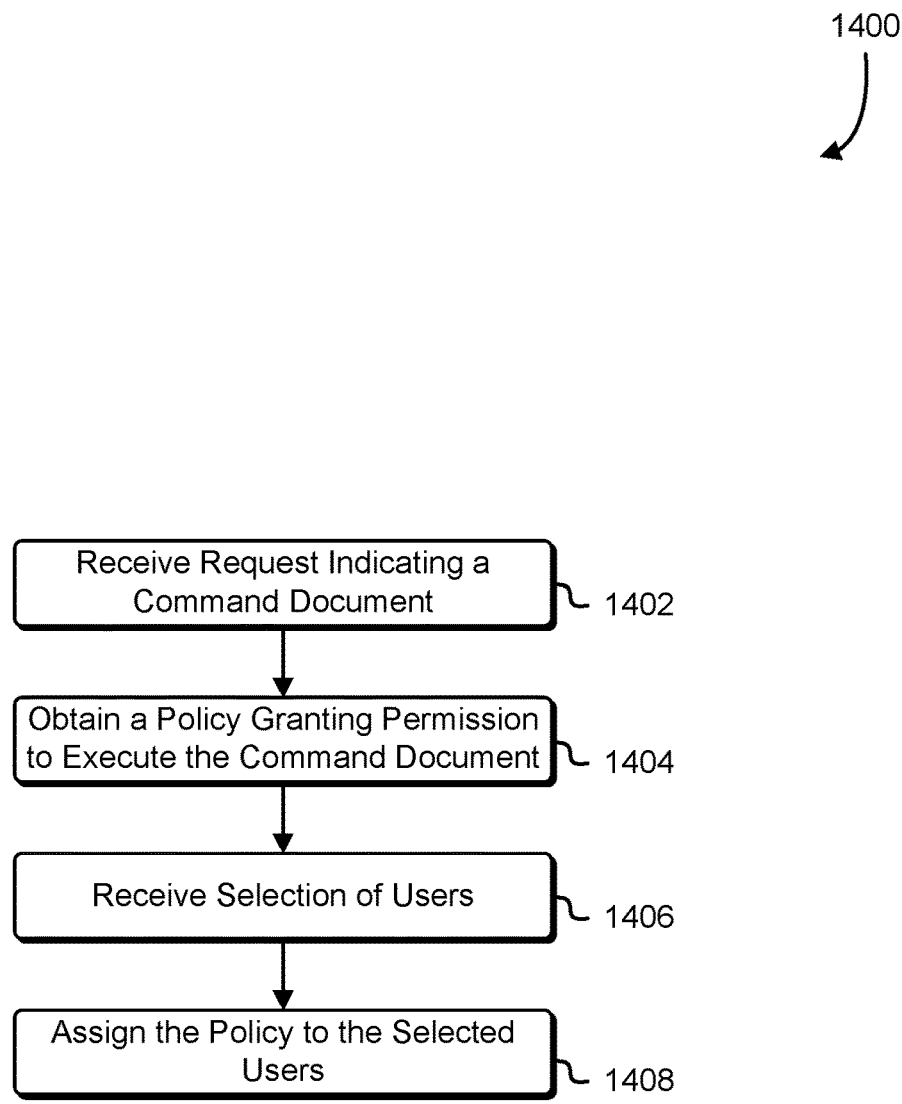
FIG. 14 is a block diagram that illustrates an example of assigning a policy to selected users in accordance with an embodiment.

FIG. 14 is a block diagram illustrating an example of a process 1400 for assigning a policy that grants permission to a user to execute a command document in accordance with various embodiments. Some or all of the process 1400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 17:
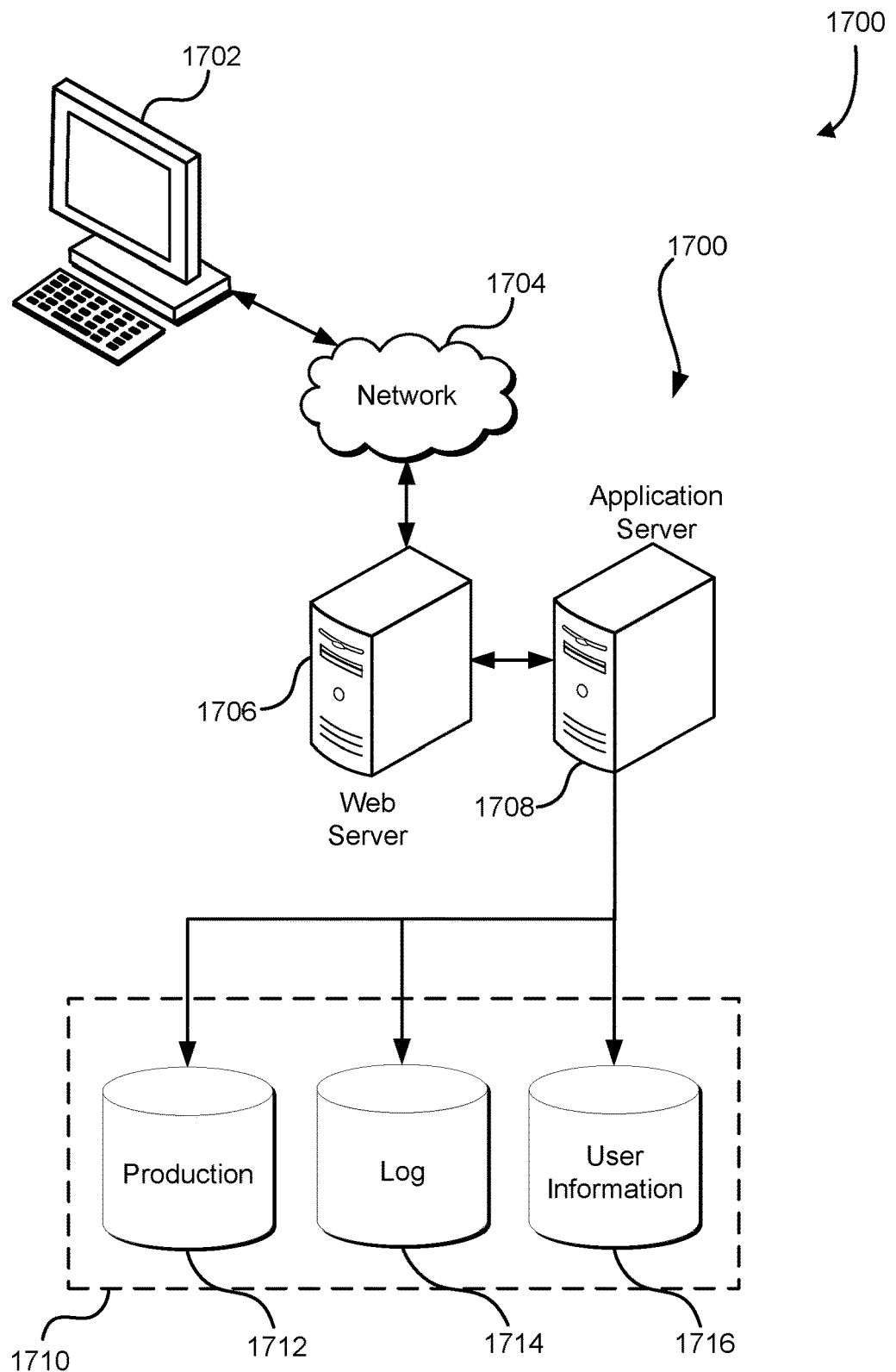
FIG. 17 illustrates an environment in which various embodiments can be implemented.

For example, some or all of process 1400 may be performed by any suitable system, such as a server in a data center, by various components of the environment 1700 described in conjunction with FIG. 17, such as the web server 1706 or the application server 1708, by multiple computing devices in a distributed system of a computing resource service provider, or by any electronic client device such as the electronic client device 1702. The process 1400 includes a series of operations wherein the system performing the process 1400 receives a request that indicates a command document, obtains a policy that grants permission to execute the document, receives a selection of users to associate with the policy, and assigns the policy to the selected users.

In 1402, the system performing the process 1400 receives a request, from a requesting entity, that indicate the command document. The requesting entity may be an administrator, such as the administrator 102 of FIG. 1, or some other entity authorized to administrate command documents. As noted, the command document may include a set of commands and a set of required and optional parameters for carrying out those commands against resources associated with an account provided by a computing resource service provider. The context of indicating the command document includes any manner of identifying, to the system, the set of commands and parameters of the command document, such as by providing the contents of the command document itself, providing a selection of a predefined command document through a command line, through a console interface, or programmatically, providing an identifier associated with an existing command document, selecting a command document from a set of command documents, and so on. Note that more than one command document may be indicated by the request of 1402.

In 1404, the system performing the process 1400 may obtain a policy that grants permission to execute the command document. The policy may be generated on-the-fly by the system or may be created by an administrator of the customer account or some other authorized entity at a time before, after, or in conjunction with the operations of 1402. The policy may be specific to the indicated command document of 1402, or may be drafted in such a way as to apply to more than one command document. The policy may be stored and maintained at a policy management service of the computing resource service provider. Note that, if multiple requests are indicated by the request of 1402, multiple policies may be obtained in 1404.

In 1406, the system performing the process 1400 may receive a selection of a set of users to which the policy granting access to the command document of 1402 should be applied. The selection of the set of users may be obtained from a programmatic selection (e.g., by an executing software application) or selection through a command line or console interface by an administrator of the account, or some other entity authorized to associate users with a policy that grants permission to execute command documents. The selection may include identifiers that are uniquely associated with each user of the set of users, may include an identifier for a group to which the set of users belong, may include a selection of a role associated with the set of users, or some other manner for identifying the user selected.

Finally, in 1408, the system performing the process 1400 may assign the policy or policies of 1404 that grants permission to execute the command document or documents of 1402 with the set of users selected in 1406. The system may assign the policy by submitting a request for associating the policy or policies with the selected set of users to a policy management service of the computing resource service provider, and as a result, the policy management service may cause the policy or policies to be associated with the selected set of users, thereby granting the selected set of users permission to execute the command document or documents of 1402. Note that one or more of the operations performed in 1402-08 may be performed in various orders and combinations, including in parallel.

Figure 15:
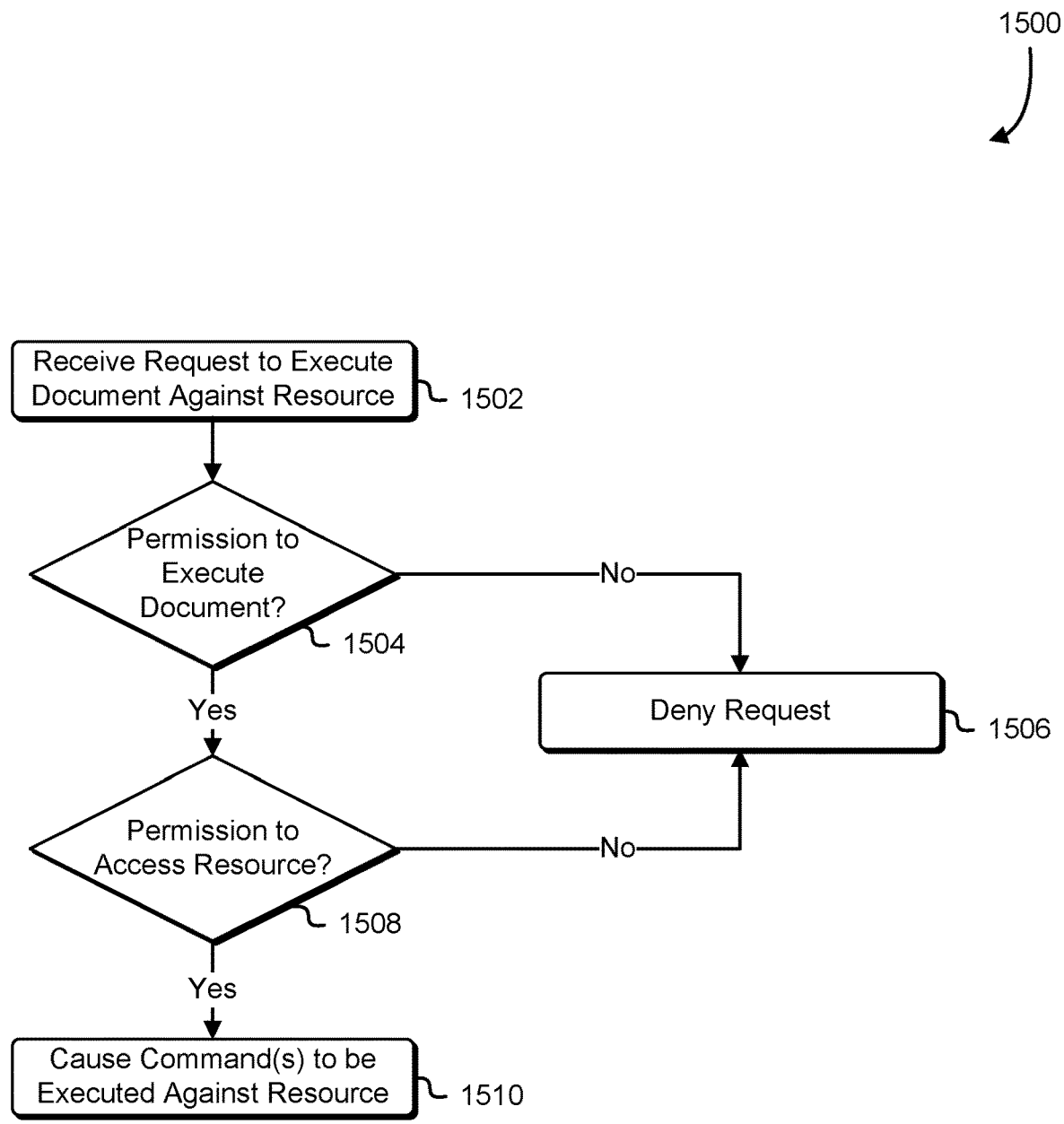
FIG. 15 is a flowchart that illustrates an example of access verification in accordance with an embodiment.

FIG. 15 is a flowchart illustrating an example of a process 1500 for executing a command document in accordance with various embodiments. Some or all of the process 1500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1500 may be performed by any suitable system, such as a server in a data center, by various components of the environment 1700 described in conjunction with FIG. 17, such as the web server 1706 or the application server 1708, by multiple computing devices in a distributed system of a computing resource service provider, or by any electronic client device such as the electronic client device 1702. The process 1500 includes a series of operations wherein a request is received to execute a command document against a resource, access permissions of the requestor are verified, and commands of the command document are sent to be executed against the resource.

In 1502, the system performing the process 1500 receives a request to execute a command document. The request should include an indication of which command document should be executed and may also include a selection for a set of resources to which the commands of the command document should be performed. The request may be received in part; that is a request to execute a command document may be received first, followed by a request indicating the set of resources, or vice versa. As noted, the resources may be any suitable type of physical or virtual computing resources as may be provided by a computing resource service provider to its customers, including virtual machine instances, data storage resources, network resources, and so on.

In 1504, the system performing the process 1500 may determine whether the requestor has sufficient permissions to cause the command document to be executed. For example, the system may query a policy management service of a computing resource service provider providing the run command service of the present disclosure to determine whether the requestor is associated with a policy (such as the policy of 1404 of FIG. 14) that grants the requestor permission to execute the policy. If the system is unable to verify that the requestor has sufficient permissions to cause the command document to be executed, the system may proceed to 1506, whereupon the request is denied. In some cases, denial of the request may include an error message provided in response to the request.

Otherwise, if the system performing the process 1500 confirms that the requestor has sufficient permissions to have the command document executed on his/her/its behalf, the system may proceed to 1508, whereupon the system may determine whether the requestor has access permissions to the selected set of resources. In some implementations, if the requestor has access permissions to some of the selected set resources but not others of the selected set of resources, the system may omit resources to which the requestor lacks access from the selected set of resources to which the command document is to be executed. In other implementations, if the requestor lacks access to any of the selected set of resources, the system may deny the request and disallow execution of the command document against any of the selected set of resources.

In some implementations, the system may query a policy management service of the computing resource service provider to determine whether the requestor has any type of permissions to access the selected set of resources. For example, having read access to the selected set of resources may be sufficient to determine that the requestor has access to the selected set of resources; however, when commands of the command document are executed against particular resources to which permission other than "read" are required, execution may be attempted under the authority of the requestor and consequently fail because the requestor has insufficient permission to perform the operation. In other implementations, the system may determine (e.g., via a policy management service) whether, for each command specified in the command document, the requestor has sufficient permissions to perform the specified command. In still other implementations, the system may additionally determine whether the requestor has sufficient permissions to perform the specified command using specified parameters (e.g., it may not be sufficient that the requestor simply has some "delete" permissions to the resource, but must have "delete" permissions to the files of the resource that the requestor is attempting to delete). If the requestor does not have sufficient access privileges to the specified set of resources, the system may proceed to 1506 to deny the request. Otherwise, if the requestor has sufficient access privileges to the specified set of resources, in 1510, system may cause the commands of the command document to be executed against the specified set of resources. Further details regarding operations of 1510 may be found in the description of the process 1600 of FIG. 16.

Note that one or more of the operations performed in 1502-1510 may be performed in various orders and combinations, including in parallel. As another example, the operations of 1508 may be performed prior to or in parallel with the operations of 1504. Note also that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 16:
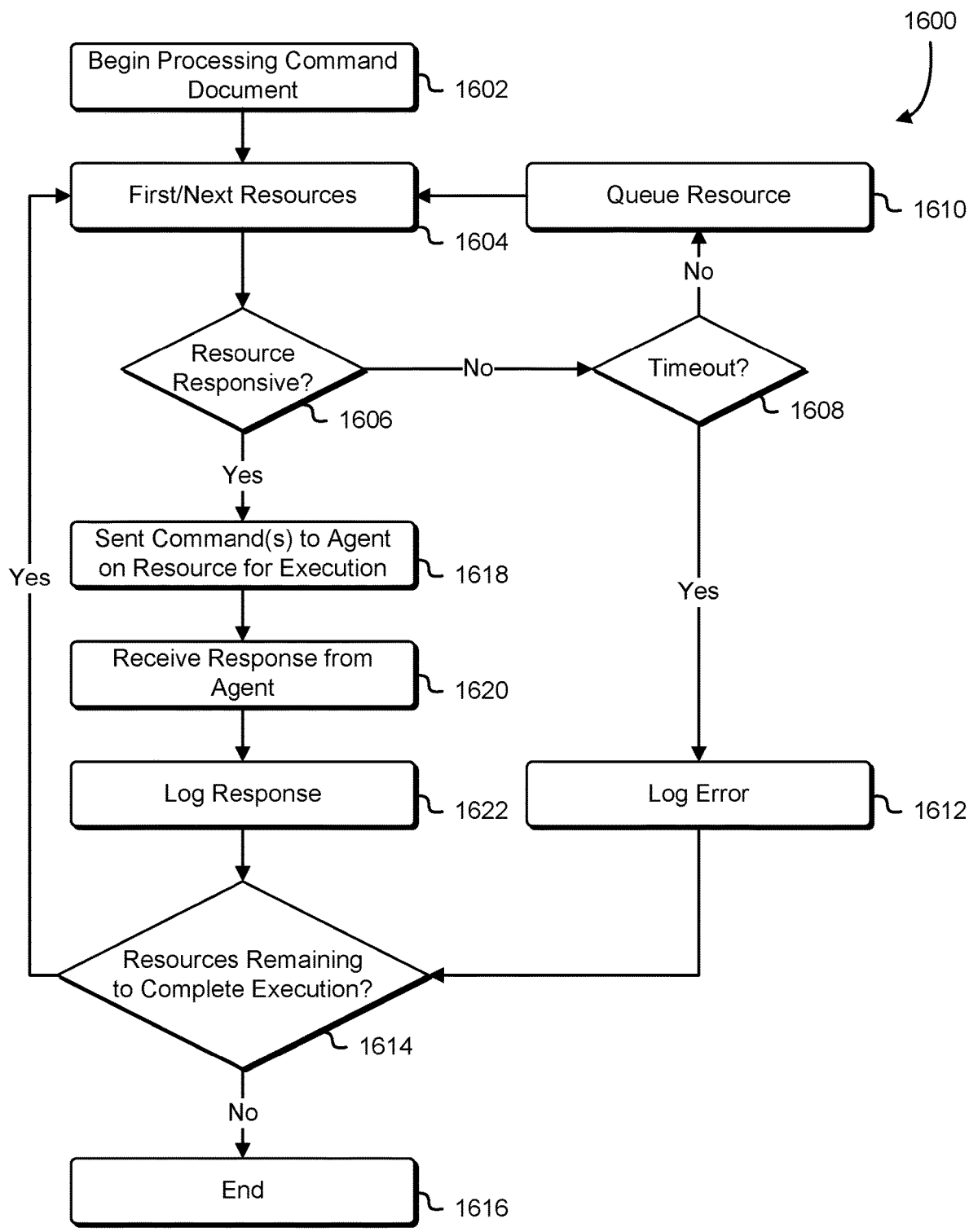
FIG. 16 is a flowchart that illustrates an example of command document execution in accordance with an embodiment.

FIG. 16 is a flowchart illustrating an example of a process 1600 for executing a command document in accordance with various embodiments. Some or all of the process 1600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1600 may be performed by any suitable system, such as a server in a data center, by various components of the environment 1700 described in conjunction with FIG. 17, such as the web server 1706 or the application server 1708, by multiple computing devices in a distributed system of a computing resource service provider, or by any electronic client device such as the electronic client device 1702. The process 1600 includes a series of operations wherein the system may iterate through a set of specified instances and commands of the command document, cause the commands of the command document to be performed against the instances, and log the result.

In 1602, the run command service may begin processing the command document indicated in the request of 1502 of FIG. 15. In 1604, a first subset of resources of the selected set of resources may be selected. In some cases, selection of the set of resources may be accomplished via receiving a message from a message queue, such as the queue 246 of FIG. 2, whereby the message indicates the subset resources and the command document to be executed against the subset. Note that in some cases, execution of the command document may be highly parallel; that is, rather than repeating through the operations of 1604-1614 for each resource of the selected set of resource, the operations of 1602-1616 may be performed separately (omitting the operations of 1614, thereby only running once per resource) in separate threads running in parallel. In other cases, the operations of the process 1600 may be run against batches (i.e., subsets) of resources in parallel. That is, the selected set of resources may be divided into subsets (e.g., first subset, second subset, third subset, etc.), and the command document may be executed, in parallel, against each resource of the subset. When the command document execution ends for each resources of one subset, the process 1600 may be repeated for the next subset, and so on. Likewise, in some cases, the operations may be performed serially; that is, for each resource of the selected set, the operations of 1602-1614 may be repeated until the command document has been executed (or attempted to be executed) against all resources of the selected set.

In 1606, the system performing the process 1600 may determine whether resources of the selected subset are responsive or otherwise receptive to receive and execute the commands of the command document. In some implementations, this may be determined by obtaining a time of the last received heartbeat from the resources and making a determination, based on the heartbeat, whether the resource are unresponsive (e.g., whether the difference between the current time and the time of the last received heartbeat exceeds the threshold). In other implementations, this may be determined by sending an Internet Control Message Protocol echo (i.e., ping) request to the resources, and if no reply is received or the echo request otherwise times out, the resources may be determined to be unresponsive. In still other implementations, a message may be sent to one or more agents residing at the resources, and the agents may reply to the effect that, while the resources are responsive, they are currently busy or otherwise in a state that is unreceptive for executing the commands of the command document. In the event that the system performing the process 1600 determines that the resources are unresponsive or otherwise unreceptive, the system may proceed to 1608, whereupon the system may determine whether to retry execution on the instance.

That is, in 1608, the system performing the process 1600 may determine whether a number of iterations of 1604-1610 have exceeded a retry threshold or whether the resources have been unresponsive or unreceptive for threshold amount of time. If not, the system may proceed to 1610, whereupon the instance and command ID may be placed in a message in at the end of a message queue, and reach right after some period of time has passed. In some implementations, this may be the same message queue as a message queue providing the selected set of resources of 1604. In other implementations, a retry queue may be a separate queue for unresponsive and unreceptive resources. Resources may be associated with a counter, and the counter may be referenced in 1608 to determine whether a threshold number of retries for the unresponsive/unreceptive resources have been exceeded. In other implementations the resources may be associated with a timestamp, which may be used in 1608 to determine whether a timeout threshold has been exceeded.

In the event it is determined that no further attempts will be made to determine whether the instance is responsive or otherwise determine whether the instance is receptive to commands, in 1612, an entry may be made, such as with the database service 248 of FIG. 2, updating the status of the instance to indicate that the commands could not be performed on the particular instance (e.g., a status of "timed out," indicating that the command has been cancelled and no further attempts will be made), and the system performing the process 1600 may proceed to 1614. The commands may be removed from the queue or not returned to the queue in order to cancel further attempts to execute the command or determine whether the instance is receptive. In 1614, the system may determine whether any instances of the specified set of instances remained that have not completed execution of the indicated command document. If all instances of the specified set of instances have been processed against the command document, the system may proceed to 1616 and end of the process 1600. Otherwise, if further instances of the specified set of instances remained to be processed, the system performing the process 1600 may return to 1604 to begin processing the next unprocessed instance of the specified set of instances (e.g., obtain the next message from the message queue).

However, if, in 1606, the resources is determined to be responsive and receptive to processing commands of the command document, the system performing the process 1600 may proceed to 1618, whereupon the system may cause the command of the command document to be sent to the an agent, such as the agent 264 of FIG. 2, at the instance for processing. The agent may respond with a status of the execution (e.g., "Running," "Completed," "Error," etc.), which may be received by the system in 1620.

As a result of receiving the response, the system performing the process, in 1622, may cause the status to be stored in a transaction log and/or updated in a database such as at the database service 268 of FIG. 2, whereupon the system may proceed to 1614 to determine whether any instances remain to be sent commands for processing. Note that, if the received status is a status other than an indication that execution of the command document is ongoing, the system may continue to receive status updates from the agent, and may continue to log the status update or update the status in a database, until the agent indicates that command processing has completed. Note that one or more of the operations performed in 1602-1622 may be performed in various orders and combinations, including in parallel. For example, the system performing the process 1600 may first determine which resources are responsive prior to allowing the requestor to specify the set of resources, and in such case the operations of 1606-1622 may be omitted.

FIG. 17 illustrates aspects of an example environment 1700 for implementing aspects in accordance with various embodiments. As will be appreciated, although a web-based environment is used for purposes of explanation, different environments may be used, as appropriate, to implement various embodiments. The environment includes an electronic client device 1702, which can include any appropriate device operable to send and/or receive requests, messages, or information over an appropriate network 1704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1704 can include any appropriate network, including an intranet, the Internet, a cellular network, a local area network, a satellite network or any other network and/or combination thereof. Components used for such a system can depend at least in part upon the type of network and/or environment selected. Many protocols and components for communicating via such a network are well known and will not be discussed in detail. Communication over the network 1704 can be enabled by wired or wireless connections and combinations thereof. In this example, the network 1704 includes the Internet and/or other publicly-addressable communications network, as the environment includes a web server 1706 for receiving requests and serving content in response thereto, although for other networks an alternative device serving a similar purpose could be used as would be apparent to one of ordinary skill in the art.

The illustrative environment includes an application server 1708 and a data store 1710. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1708 can include any appropriate hardware, software and firmware for integrating with the data store 1710 as needed to execute aspects of one or more applications for the electronic client device 1702, handling some or all of the data access and business logic for an application. The application server 1708 may provide access control services in cooperation with the data store 1710 and is able to generate content including, text, graphics, audio, video and/or other content usable to be provided to the user, which may be served to the user by the web server 1706 in the form of HyperText Markup Language ("HTML"), Extensible Markup Language ("XML"), JavaScript, Cascading Style Sheets ("CS S"), JavaScript Object Notation (JSON), and/or another appropriate client-side structured language. Content transferred to a client device may be processed by the electronic client device 1702 to provide the content in one or more forms including, forms that are perceptible to the user audibly, visually and/or through other senses. The handling of all requests and responses, as well as the delivery of content between the electronic client device 1702 and the application server 1708, can be handled by the web server 1706 using PHP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 1710 can include several separate data tables, databases, data documents, dynamic data storage schemes and/or other data storage mechanisms and media for storing data relating to a particular aspect of the present disclosure. For example, the data store 1710 may include mechanisms for storing production data 1712 and user information 1716, which can be used to serve content for the production side. The data store 1710 also is shown to include a mechanism for storing log data 1714, which can be used for reporting, analysis or other purposes. It should be understood that there can be many other aspects that may need to be stored in the data store 1710, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. The application server 1708 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 1708. In one example, a user, through a device operated by the user, might submit a search request for a certain type of item. In this case, the data store 1710 might access the user information 1716 to verify the identity of the user and can access the catalog detail information to obtain information about items of that type. The information then can be returned to the user, such as in a results listing on a web page that the user is able to view via a browser on the electronic client device 1702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the example environment 1700 in FIG. 17 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network 1704 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 1704. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
processing a command document associated with a first entity, the command document identifying a resource and commands executable by the resource, to identify a policy associated with the first entity and limiting access, by a second entity, to a subset of the commands; and
processing a request to access the resource by:
identifying, based on information in the request, the resource, the command document, the policy, and the second entity associated with the request;
authorizing the request as a result of determining that the request is associated with the second entity; and
causing, based at least in part on the policy and the command document, execution of the subset of the commands by the resource.

2. The computer-implemented method of claim 1, further comprising verifying that the resource is capable of executing the subset of the commands.

3. The computer-implemented method of claim 2, wherein verifying that the resource is capable of executing the subset of the commands further comprises:
verifying that the second entity is authorized to access the resource; and
verifying that the resource is responsive.

4. The computer-implemented method of claim 1, wherein the resource is a virtual machine instance.

5. A system, comprising:
one or more processors; and
memory including instructions that, as a result of execution by the one or more processors, cause the system to:
obtain a command document associated with a first entity, the command document identifying a resource and commands executable by the resource;
identify a policy associated with the first entity and limiting access, by a second entity, to a subset of the commands; and
as a result of a request to access the resource:
process the request to identify the resource, the command document, the policy, and the second entity associated with the request;
authorize the request as a result of determining that the request is associated with the second entity; and
cause, based at least in part on the policy and the command document, execution of the subset of the commands by the resource.

6. The system of claim 5, wherein the first entity is an administrator associated with the resource.

7. The system of claim 5, wherein the request is obtained by the system via a programmatic interface.

8. The system of claim 5, wherein the request includes a set of parameters usable to identify the command document.

9. The system of claim 5, wherein the request includes a set of parameters usable to identify the resource.

10. The system of claim 5, wherein the instructions, as a result of execution, further cause the system to:
determine that the request is associated with a different subset of the commands outside of the subset of the commands identified in the policy; and
deny the request with respect to the different subset of the commands.

11. The system of claim 5, wherein the policy further limits access by the second entity to the resource, and
the instructions, as a result of execution, further cause the system to:
determine that the request is associated with a different resource than the resource identified in the policy; and
deny the request with respect to the different resource.

12. The system of claim 5, wherein the policy is defined, at least in part, by the first entity.

13. The system of claim 12, wherein the resource is a virtual machine accessible to the system.

14. A non-transitory computer-readable storage medium storing executable instructions that, as a result of being executed by one or more processors of a computer system, cause the computer system to at least:
- obtain a document associated with a first entity, the document identifying a resource and commands executable by the resource;
- identify a policy associated with the first entity and limiting access to a subset of the commands; and
- as a result of a request to access the resource:
  - process the request to identify the resource, the document, the policy, and a second entity associated with the request;
  - authorize the request as a result of determining that the request is associated with the second entity; and
  - cause, based at least in part on the policy and the document, execution of the subset of the commands by the resource.

15. The non-transitory computer-readable storage medium of claim 14, wherein the executable instructions that cause the subset of the commands to be executed on the resource further cause the computer system to provide the subset of the commands to a software agent executing on the resource.

16. The non-transitory computer-readable storage medium of claim 15, wherein the executable instructions further cause the computer system to provide an execution status for the subset of the commands.

17. The non-transitory computer-readable storage medium of claim 14, wherein the executable instructions further cause the computer system to, if the resource is unavailable, add the subset of the commands to a queue.

18. The non-transitory computer-readable storage medium of claim 17, wherein the executable instructions further cause the computer system to cancel the subset of the commands as a result of the subset of the commands being queued for a predetermined length of time.

19. The non-transitory computer-readable storage medium of claim 17, wherein the executable instructions further cause the computer system to cancel the subset of the commands as a result of a size of the queue exceeding a predetermined threshold.

20. The non-transitory computer-readable storage medium of claim 19, wherein the predetermined threshold is selected by the computer system as a result of a characteristic of the first entity.

* * * * *